US009078193B2

(12) United States Patent
Imai

(10) Patent No.: US 9,078,193 B2
(45) Date of Patent: Jul. 7, 2015

(54) APPARATUS FOR DETERMINING ROUTE, METHOD FOR DETERMINING ROUTE, NON-TRANSITORY COMPUTER-READABLE RECORDING MEDIUM HAVING STORED THEREIN MANAGEMENT PROGRAM, AND MANAGEMENT DEVICE

(75) Inventor: Satoshi Imai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 188 days.

(21) Appl. No.: 13/549,710

(22) Filed: Jul. 16, 2012

(65) Prior Publication Data

US 2013/0024561 A1    Jan. 24, 2013

(30) Foreign Application Priority Data

Jul. 19, 2011    (JP) ................................. 2011-157477

(51) Int. Cl.
*H04W 40/08* (2009.01)
*H04L 12/721* (2013.01)
*H04L 12/729* (2013.01)

(52) U.S. Cl.
CPC ............... *H04W 40/08* (2013.01); *H04L 45/12* (2013.01); *H04L 45/125* (2013.01); *Y02B 60/50* (2013.01)

(58) Field of Classification Search
CPC ......... G06F 15/00; G06F 13/00; G06F 13/14; G06F 17/00; H04M 1/2745; H04L 1/00; H04L 5/00; H04L 12/00; H04L 12/28; H04L 12/56; H04L 5/0001; H04L 5/003; H04L 12/04; H04L 12/24; H04L 12/2414–12/2418; H04L 12/2464–12/2467; H04L 12/2618; H04L 12/2626; H04L 12/2668–12/2671; H04L 12/2692; H04L 12/50; H04L 45/00; H04L 45/12; H04L 45/123; H04L 45/125; H04L 45/14; H04Q 1/00; H04Q 3/00; H04Q 11/00; H04Q 2011/00; H04Q 2011/0039; H04Q 2011/0081; H04Q 2011/009; H04Q 2011/0098; H04W 40/00; H04W 40/02; H04W 40/08; Y02B 60/50
USPC ................. 709/220–224, 226, 229, 238, 239, 709/241–244; 370/252–255, 245, 351
See application file for complete search history.

(56) References Cited

U.S. PATENT DOCUMENTS

| 4,788,721 A | * | 11/1988 | Krishnan et al. | ......... 379/221.07 |
| 4,905,233 A | * | 2/1990 | Cain et al. | ..................... 370/237 |

(Continued)

FOREIGN PATENT DOCUMENTS

| EP | 2166777 A1 * | 3/2010 | ............... H04Q 3/66 |
| JP | 05-268250 | 10/1993 | |

(Continued)

OTHER PUBLICATIONS

Experiments with Energy Saving Dynamic Source Routing; Jun. 14, 2008; Fang et al.*

(Continued)

*Primary Examiner* — Brian J Gillis
*Assistant Examiner* — Boris Grijalva Lobos
(74) *Attorney, Agent, or Firm* — Fujitsu Patent Center

(57) ABSTRACT

An apparatus for determining a route including: a collector that collects a current amount of link traffic and current link power consumption of each link; a virtual link setter that sets virtual links for each link; a link cost calculator that calculates a link cost of each virtual link based on the estimated increase in the link power consumption; a constraint condition setter that creates a constraint condition satisfying a requirement of end-to-end quality of a request flow based on change in quality of each virtual link and satisfying a requirement of end-to-end quality of an existing flow based on the change in quality of the existing flow on the virtual link; a route determinator that determines a route having a smallest sum of the link costs including a plurality of the virtual links satisfying the created constraint condition.

19 Claims, 30 Drawing Sheets

(56) References Cited

U.S. PATENT DOCUMENTS

| | | | | |
|---|---|---|---|---|
| 4,967,345 | A * | 10/1990 | Clarke et al. | 709/241 |
| 5,596,719 | A * | 1/1997 | Ramakrishnan et al. | 709/241 |
| 6,111,673 | A * | 8/2000 | Chang et al. | 398/79 |
| 6,137,840 | A | 10/2000 | Tiedemann et al. | |
| 6,366,559 | B1 * | 4/2002 | Krishnan et al. | 370/230 |
| 6,665,271 | B1 | 12/2003 | Thomas et al. | |
| 6,711,152 | B1 * | 3/2004 | Kalmanek et al. | 370/351 |
| 6,898,437 | B1 | 5/2005 | Larsen et al. | |
| 6,963,927 | B1 * | 11/2005 | Lee et al. | 709/241 |
| 7,111,074 | B2 * | 9/2006 | Basturk | 709/241 |
| 7,231,459 | B2 * | 6/2007 | Saraph et al. | 709/241 |
| 7,246,172 | B2 * | 7/2007 | Yoshiba et al. | 709/233 |
| 7,339,897 | B2 * | 3/2008 | Larsson et al. | 370/252 |
| 7,388,842 | B1 * | 6/2008 | Applegate et al. | 370/238 |
| 7,466,996 | B2 * | 12/2008 | Carballo | 455/574 |
| 7,502,839 | B2 * | 3/2009 | O'Sullivan et al. | 709/220 |
| 7,558,874 | B1 * | 7/2009 | Kodukula et al. | 709/237 |
| 7,580,394 | B2 * | 8/2009 | Garcia-Luna-Aceves | 370/338 |
| 7,633,873 | B1 * | 12/2009 | Kohler et al. | 370/238 |
| 7,689,693 | B2 * | 3/2010 | Doshi et al. | 709/226 |
| 7,760,742 | B2 * | 7/2010 | Wackerly | 370/400 |
| 7,822,029 | B2 * | 10/2010 | Brand et al. | 370/389 |
| 7,869,359 | B2 * | 1/2011 | Kohler et al. | 370/231 |
| 7,924,728 | B2 * | 4/2011 | Riga et al. | 370/238 |
| 7,974,213 | B2 * | 7/2011 | Sinha et al. | 370/252 |
| 8,102,761 | B2 | 1/2012 | Yamaguchi et al. | |
| 8,214,526 | B2 * | 7/2012 | Wu et al. | 709/238 |
| RE43,654 | E * | 9/2012 | Serizawa et al. | 455/509 |
| 8,259,586 | B2 | 9/2012 | Watsen et al. | |
| 8,295,173 | B2 | 10/2012 | Larsson et al. | |
| 8,428,070 | B2 * | 4/2013 | Ichiki et al. | 370/396 |
| 8,509,099 | B2 * | 8/2013 | Sengupta et al. | 370/252 |
| 8,542,591 | B2 * | 9/2013 | Saito | 370/232 |
| 8,547,866 | B2 * | 10/2013 | Imai | 370/252 |
| 8,600,721 | B2 * | 12/2013 | Ide et al. | 703/13 |
| 8,682,633 | B2 * | 3/2014 | Ide et al. | 703/13 |
| 8,687,498 | B2 * | 4/2014 | Imai | 370/238 |
| 2001/0029543 | A1 * | 10/2001 | Iwata et al. | 709/233 |
| 2002/0120770 | A1 * | 8/2002 | Parham et al. | 709/238 |
| 2003/0023750 | A1 * | 1/2003 | Basturk | 709/241 |
| 2003/0064744 | A1 | 4/2003 | Zhang et al. | |
| 2003/0193898 | A1 * | 10/2003 | Wong et al. | 370/252 |
| 2005/0188073 | A1 * | 8/2005 | Nakamichi et al. | 709/223 |
| 2005/0240386 | A1 * | 10/2005 | Carballo et al. | 703/14 |
| 2005/0249121 | A1 * | 11/2005 | Matsunaga | 370/252 |
| 2006/0183471 | A1 * | 8/2006 | Samuel et al. | 455/423 |
| 2006/0224701 | A1 * | 10/2006 | Camp, Jr. | 709/219 |
| 2007/0002748 | A1 * | 1/2007 | Nakata et al. | 370/238 |
| 2007/0025346 | A1 * | 2/2007 | Kecskemeti | 370/389 |
| 2007/0149201 | A1 * | 6/2007 | Dominique et al. | 455/442 |
| 2007/0248067 | A1 * | 10/2007 | Banerjea et al. | 370/338 |
| 2008/0232258 | A1 * | 9/2008 | Larsson et al. | 370/238 |
| 2009/0003353 | A1 * | 1/2009 | Ding et al. | 370/395.53 |
| 2009/0052327 | A1 | 2/2009 | Larsson et al. | |
| 2009/0154465 | A1 * | 6/2009 | Diab et al. | 370/395.1 |
| 2009/0168653 | A1 * | 7/2009 | St. Pierre et al. | 370/238 |
| 2010/0118881 | A1 | 5/2010 | Palmer et al. | |
| 2011/0075583 | A1 * | 3/2011 | Imai et al. | 370/252 |
| 2011/0116405 | A1 * | 5/2011 | Coppage et al. | 370/252 |
| 2011/0142041 | A1 * | 6/2011 | Imai | 370/389 |
| 2011/0142060 | A1 * | 6/2011 | Manral | 370/401 |
| 2011/0204719 | A1 * | 8/2011 | Sackman et al. | 307/42 |
| 2011/0205901 | A1 * | 8/2011 | Imai | 370/238 |
| 2011/0286348 | A1 * | 11/2011 | Yamasaki et al. | 370/252 |
| 2012/0033555 | A1 * | 2/2012 | Liu et al. | 370/238 |
| 2012/0033567 | A1 * | 2/2012 | Yamada et al. | 370/252 |
| 2012/0057868 | A1 * | 3/2012 | Wang et al. | 398/49 |
| 2012/0124398 | A1 * | 5/2012 | Diab | 713/310 |
| 2012/0213081 | A1 * | 8/2012 | Imai | 370/238 |
| 2012/0236726 | A1 * | 9/2012 | Shihada et al. | 370/237 |
| 2012/0263294 | A1 * | 10/2012 | Kuo | 379/395.01 |
| 2013/0136034 | A1 * | 5/2013 | Imai | 370/255 |
| 2013/0165187 | A1 * | 6/2013 | Kusakabe et al. | 455/574 |
| 2013/0258879 | A1 * | 10/2013 | Soumiya et al. | 370/252 |
| 2013/0315257 | A1 * | 11/2013 | Welin et al. | 370/401 |
| 2014/0043999 | A1 * | 2/2014 | Bugenhagen | 370/252 |

FOREIGN PATENT DOCUMENTS

| | | | | |
|---|---|---|---|---|
| JP | 07154420 | A * | 6/1995 | H04L 12/56 |
| JP | 2003-527039 | | 9/2003 | |
| JP | 2003-338832 | | 11/2003 | |
| JP | 2003338832 | A * | 11/2003 | H04L 12/56 |
| JP | 2005-518717 | | 6/2005 | |
| JP | 2007-142609 | | 6/2007 | |
| JP | 2008-311830 | | 12/2008 | |
| JP | 2011199836 | A * | 10/2011 | |
| JP | 2013026702 | A * | 2/2013 | |
| WO | 00/65783 | | 11/2000 | |
| WO | 01/69866 | A1 | 9/2001 | |
| WO | 2006/001820 | A1 | 1/2006 | |

OTHER PUBLICATIONS

Quality-of-Service Routing for Supporting Multimedia Applications; Sep. 7, 1996; Zheng et al.*

End-to-End Quality of Service Constrained Routing and Admission Control for MPLS Networks; Jun. 3, 2009; Journal of Communications and Networks, vol. 11; Oulai et al.*

USPTO, (Jung Liu) Non-Final Rejection mailed on Nov. 7, 2012, in related U.S. Appl. No. 13/017,692 [issued—now US Patent 8547866].

USPTO, (Tran) Non-Final Rejection mailed on Feb. 15, 2013, in related U.S. Appl. No. 13/030,492 [issued—now US Patent 8687498].

USPTO, (Tran) Final Rejection mailed on Aug. 21, 2013, in related U.S. Appl. No. 13/030,492 [issued—now US Patent 8687498].

JPOA—Japanese Office Action for related Japanese Patent Application No. 2010-037546, mailed Jun. 25, 2013, with partial English translation of the relevant part.

* cited by examiner

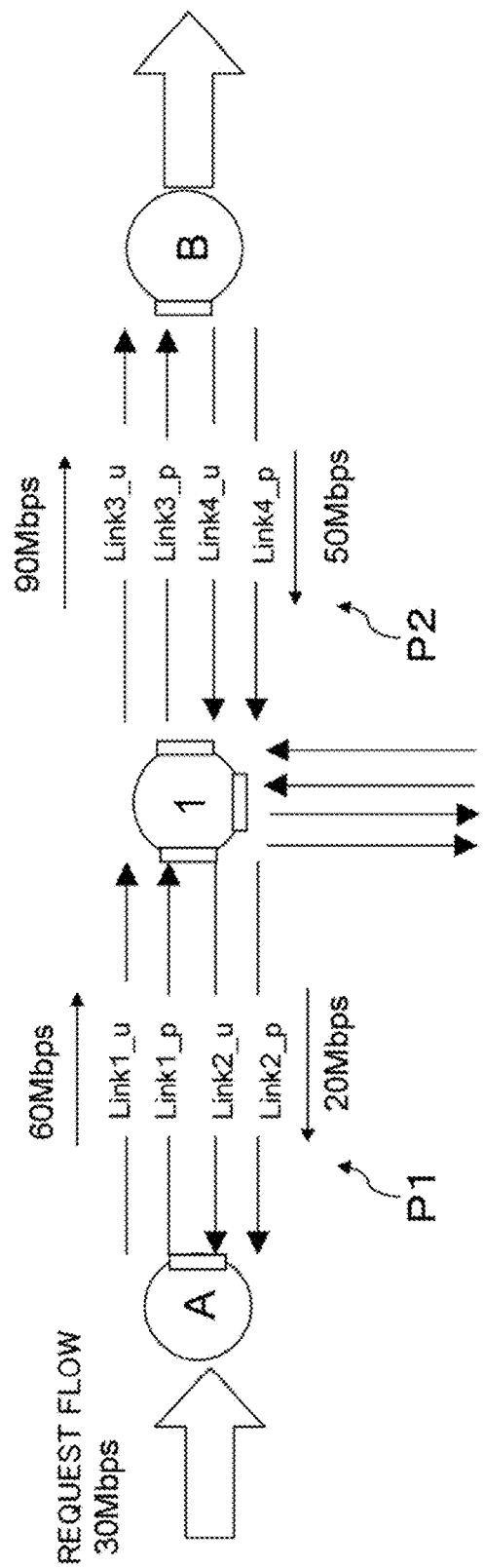

FIG. 5

LINK COST CALCULATING DATA 115

| | Link1 | Link2 | Link3 | Link4 |
|---|---|---|---|---|
| DESTINATION NODE | node1 | node A | node B | node1 |
| LINK TRAFFIC AMOUNT (Mbps) | 60 | 20 | 90 | 50 |
| MAXIMUM TRAFFIC (Mbps) OF PHYSICAL LINK | 60(>20) | 60(>20) | 90(>50) | 90(>50) |
| PHYSICAL LINK RATE (Mbps) | 100 | 100 | 100 | 100 |
| LINK POWER CONSUMPTION (W) | 0.1+0.1 | 0.1+0.1 | 0.1+0.1 | 0.1+0.1 |
| VIRTUAL LINK | Link1_p | Link1_u | Link2_p | Link2_u | Link3_p | Link3_u | Link4_p | Link4_u |
| LINK TRAFFIC AMOUNT (Mbps) WHEN NEW FLOW IS ADDED | | 90 | 50 | | | 120 | | 80 |
| MAXIMUM TRAFFIC AMOUNT (Mbps) OF PHYSICAL LINK WHEN NEW FLOW IS ADDED | 90(>20) | | 60(>50) | | 120(>50) | | 90(>80) | |
| VIRTUAL LINK RATE (Mbps) | 100 | 1000 | 100 | 1000 | 1000 | 10000 | 100 | 1000 |
| LINK POWER CONSUMPTION (W) OF VIRTUAL LINK | 0.1+0.1 | 0.4+0.4 | 0.1+0.1 | 0.4+0.4 | 0.4+0.4 | 3.6+3.6 | 0.1+0.1 | 0.4+0.4 |
| VIRTUAL LINK COST (POWER INCREASE) | δ (MINUTE) | 0.6 | δ | 0.6 | 0.6 | 7.0 | δ | 0.6 |

FIG. 9

Traffic Route Design Model

Minimize $$\min \sum_{r \in \{p,u\}} \sum_{(i,j) \in E} c_{ij}^{tr}(R_{ij} + B_r) \cdot X_{ij}^{tr}$$

subject to $$\sum_{r \in \{p,u\}} \left( \sum_j X_{(ij)}^{tr} - \sum_j X_{(ji)}^{tr} \right) = \begin{cases} 1 & \forall i = s \\ -1 & \forall i = d \\ 0 & \forall i \neq s,d \end{cases}$$

$$\sum_{r \in \{p,u\}} \sum_{(i,j) \in E, i \neq j} X_{ij}^{tr} \leq H$$

$$\sum_{r \in \{p,u\}} \sum_{(i,j) \in E, i \neq j} f_d^{tr}(R_{ij} + B_r) \cdot X_{ij}^{tr} \leq D_r$$

$$\sum_{r \in \{p,u\}} \sum_{(i,j) \in E, i \neq j} f_l^{tr}(R_{ij} + B_r) \cdot X_{ij}^{tr} \leq L_r$$

$$\sum_{r \in \{p,u\}} \sum_{(i,j) \in E, i \neq j} \{(d_{ij}^{tr}(R_{ij} + B_r) - f_d^p(R_{ij})Y_{ij}^k) \cdot X_{ij}^{tr} \leq D_k - f_d^p(R_{ij})Y_{ij}^k\}$$

$$\sum_{r \in \{p,u\}} \sum_{(i,j) \in E, i \neq j} \{(d_{ij}^{tr}(R_{ij} + B_r) - f_l^p(R_{ij})Y_{ij}^k) \cdot X_{ij}^{tr} \leq L_k - f_l^p(R_{ij})Y_{ij}^k\}$$

FIG. 10

| VARIABLE NAME | USAGE | DEFINITION |
|---|---|---|
| $X_{(i,j)}^{l_r} \in \{0,1\}$ | Design | WHETHER REQUEST PATH PASSES THROUGH LINK (i→j) OF RATE $l_r$ IS PRESENT |
| $c_{i,j}^{l_r}()$ | Given | POWER INCREASED WHEN REQUEST PATH IS CARRIED IN LINK (i→j) OF RATE $l_r$ |
| $H$ | Given | UPPER LIMIT OF THE NUMBER OF HOPS TO REQUEST PATH |
| $B_r$ | Given | BAND TO BE USED BY REQUEST PATH |
| $R_{i,j}$ | Given | CURRENT FORWARDING TRAFFIC AMOUNT TO LINK (i→j) |
| $D_r$ | Given | END-TO-END DELAY REQUIREMENT OF REQUEST PATH |
| $L_r$ | Given | END-TO-END LOSS RATE OF REQUEST PATH |
| $f_d^{l_r}()$ | Given | BUFFERING DELAY WHEN TRAFFIC IS FORWARDED AT RATE $l_r$ |
| $f_l^{l_r}()$ | Given | BUFFERING LOSS RATE WHEN TRAFFIC IS FORWARDED AT RATE $l_r$ |

FIG. 12

QUALITY CONSTRAINT GENERATING DATA 116

| LINK | Link1 | Link2 | Link3 | Link4 |
|---|---|---|---|---|
| DESTINATION NODE | node1 | node A | node B | node1 |
| LINK TRAFFIC AMOUNT (Mbps) | 60 | 20 | 90 | 50 |
| PHYSICAL LINK RATE (Mbps) | 100 | 100 | 100 | 100 |
| BUFFERING DELAY | $f_d^p(60)$ | $f_d^p(20)$ | $f_d^p(90)$ | $f_d^p(50)$ |
| LOSS RATE | $f_l^p(60)$ | $f_l^p(20)$ | $f_l^p(90)$ | $f_l^p(50)$ |
| VIRTUAL LINK | Link1_p / Link1_u | Link2_p / Link2_u | Link3_p / Link3_u | Link4_p / Link4_u |
| LINK TRAFFIC (Mbps) WHEN NEW FLOW IS ADDED | 90 | 50 | 120 | 80 |
| VIRTUAL LINK RATE (Mbps) | 100 / 1000 | 100 / 1000 | 1000 / 10000 | 100 / 1000 |
| BUFFERING DELAY WHEN NEW FLOW IS ADDED | $f_d^p(90)$ / $f_d^u(90)$ | $f_d^p(50)$ / $f_d^u(50)$ | $f_d^p(120)$ / $f_d^u(120)$ | $f_d^p(80)$ / $f_d^u(80)$ |
| LOSS RATE WHEN NEW FLOW IS ADDED | $f_l^p(90)$ / $f_l^u(90)$ | $f_l^p(50)$ / $f_l^u(50)$ | $f_l^p(120)$ / $f_l^u(120)$ | $f_l^p(80)$ / $f_l^u(80)$ |

FIG. 14

Minimize $$\min \sum_{h \in \{p,a\}} \sum_{r} \sum_{(i,j) \in E_{p,a}} c_{ij}^h(R_{ij}+B_r) \cdot x_{ij}^{hr}$$

subject to $$\sum_{h \in \{p,a\}} \left( \sum_{r} x_{(i,j)}^{hr} - \sum_{r} x_{(j,i)}^{hr} \right) = \begin{cases} 1 & \forall i = s \\ -1 & \forall i = d \\ 0 & \forall i \ne s, d \end{cases}$$

$$\sum_{(i,j) \in E_{p,a}} x_{ij}^{hr} \le H$$

$$\sum_{(i,j) \in E_{p,a}} c_{ij}^h(R_{ij}+B_r) \cdot x_{ij}^{hr} \le D_r$$

$$\sum_{(i,j) \in E_{p,a}} c_{ij}^p(R_{ij}+B_r) \cdot x_{ij}^{hr} \le L_r$$

$$\sum_{(i,j) \in E_{p,a}} \{(c_{ij}^p(R_{ij}+B_r) - c_{ij}^a(R_{ij})) Y_{ij}^r\} \cdot x_{ij}^{hr} \le D_R - c_{ij}^a(R_{ij})$$

$$\sum_{(i,j) \in E_{p,a}} \{(c_{ij}^p(R_{ij}+B_r) - c_{ij}^a(R_{ij})) Y_{ij}^r\} \cdot x_{ij}^{hr} \le L_r - c_{ij}^a(R_{ij})$$

f.obj=c($\delta$,0.6,$\delta$,0.6,0.6,0.6,7,$\delta$,0.6)

$X_{A1}^p, X_{A1}^H, X_{1A}^p, X_{1A}^H, X_{B1}^p, X_{B1}^H, X_{1B}^p, X_{1B}^H$ $X_{A1}^p, X_{A1}^H, X_{1A}^p, X_{1A}^H, X_{B1}^p, X_{B1}^H, X_{1B}^p, X_{1B}^H$ f.con    f.dir    f.rhs

[0-1 INTEGER PROGRAMMING SOLVER]
lp("min", f.obj, f.con, f.dir, f.rhs, all.bin = T)$solution

[OUTPUT DATA]

$X_{A1}^p, X_{A1}^H, X_{1A}^p, X_{1A}^H, X_{B1}^p, X_{B1}^H, X_{1B}^p, X_{1B}^H$ 1, 0, 0, 0, 0, 0, 0, 1

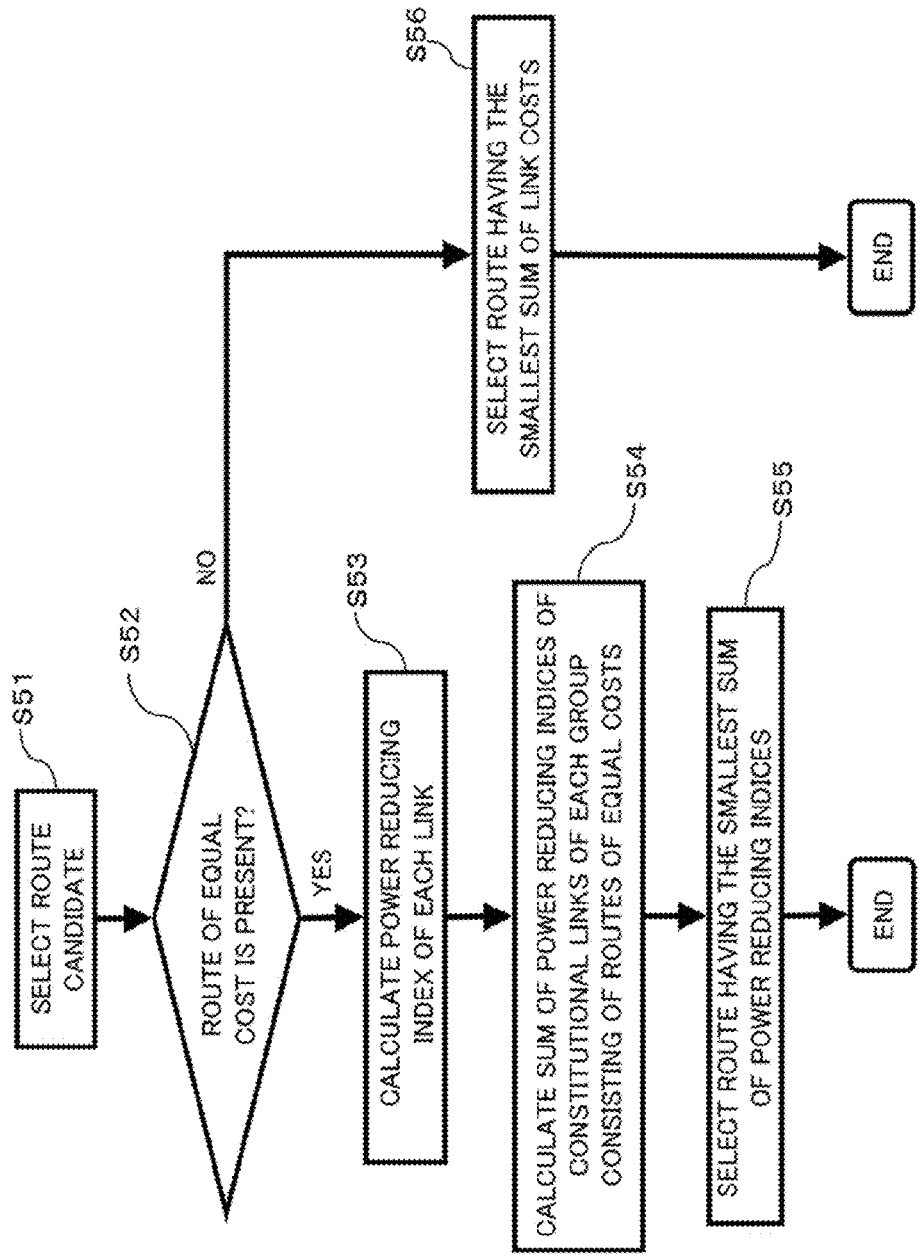

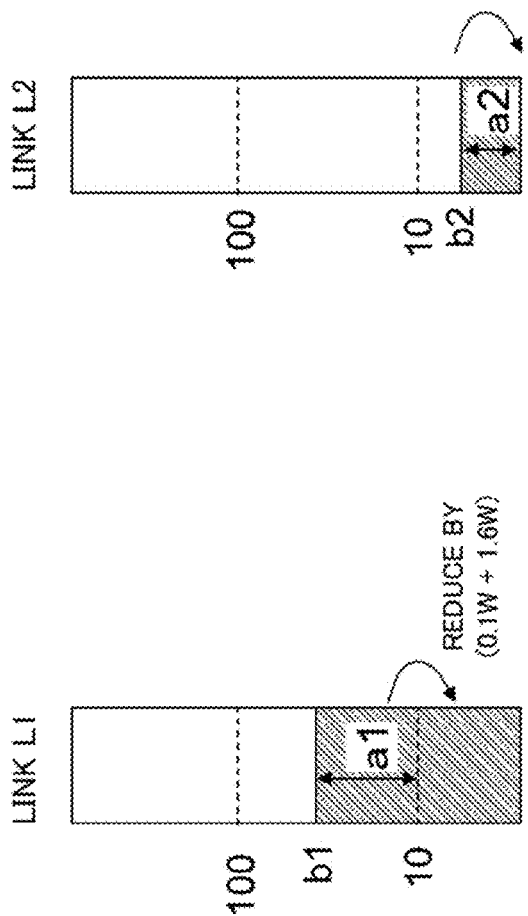

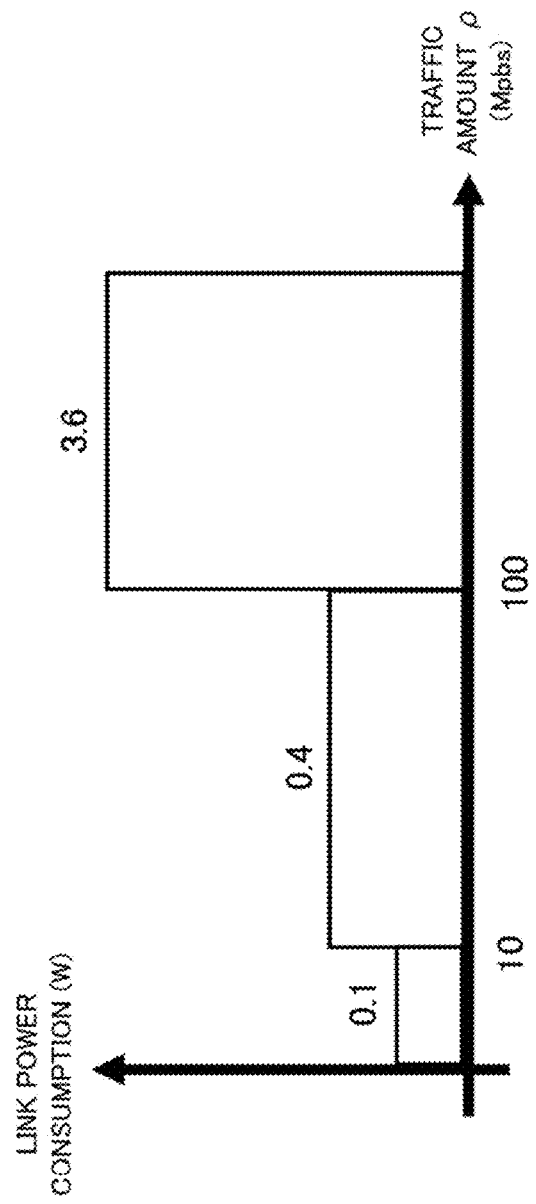

APPARATUS FOR DETERMINING ROUTE, METHOD FOR DETERMINING ROUTE, NON-TRANSITORY COMPUTER-READABLE RECORDING MEDIUM HAVING STORED THEREIN MANAGEMENT PROGRAM, AND MANAGEMENT DEVICE

CROSS-REFERENCE TO RELATED APPLICATIONS

This application is based upon and claims the benefit of priority of the prior Japanese Patent Application No. 2011-157477, filed on Jul. 19, 2011, the entire contents of which are incorporated herein by reference.

FIELD

The embodiment discussed herein is related to a technique of calculating a route of a request flow in a network.

BACKGROUND

In a network consisting of a number of nodes and many links connecting the nodes, a flow setting request is issued in order to establish a flow between nodes (origin node and terminal node) through which data is transmitted from a terminal to a destination terminal. The term "flow" here means a flow of data, which can be translated into a "session" or a "path". In response to the flow setting request, a route design system that operates on a Network Management System (NMS) that is connected to each node in the network and that manages the node determines the optimum route on the network and incorporates the flow into the determined route.

Conventional manners of determining an optimum route have proposed a scheme that determines the optimum route having a smallest sum of link costs based on the costs defined for the respective links according to an amount of traffic and an objective function (MIN$\{\Sigma_i \Sigma_j L_{i,j}\}$, where $L_{i,j}$ represents a link cost of a link from the node i to the node j) (see, for example, Patent Literature 1 and 2).

Here, a cost is a physical value that traffic processing of each flow costs each node, and is exemplified by transmission power, receiving power, a bandwidth of the link and a using fee of the line accompanied by using the link.

[Patent Literature 1] Japanese National Publication of International Patent Application No. 2005-518717
[Patent Literature 2] Japanese Laid-open Patent Publication No. 2003-338832

A node having a power-saving function, such as Adaptive Link Rate (ALR), that controls a processing rate depending on traffic generally undergoes stepwise power control as denoted in the example of FIG. 29 that controls to have power 0 W at traffic of 0 Mbps; power 0.1 W at traffic in the range of 0-10 Mbps; power 0.4 W at traffic in the range of 10-100 Mbps; and power 3.6 W at traffic exceeding 100 Mbps.

In a conventional route calculating system, a route of a newly request flow is calculated such that amounts of traffic or power consumption of the respective links are leveled based on the link costs of the network when the flow setting request is issued.

Here, description will now be made in relation to an example of a network of FIG. 30A. In this network of FIG. 30A, the link from the node A1 to the node C1 has a traffic volume (forwarding amount) of 110 Mbps and therefore has link power consumption of 3.6 W from the relationship of FIG. 29.

Here, a flow setting request of a flow from the node A1 to the node B1 of 10 Mbps is assumed to be issued in the network in the above state. The links of the route passing through the nodes A1, C1 and B1 have link traffic volume of 110 Mbps and 120 Mbps and link power consumption of 3.6 W and 3.6 W while the links of the route passing through the nodes A1, D1, and B1 have link traffic volume of 50 Mbps and 95 Mbps and link power consumption of 0.4 W and 0.4 W. Since the conventional manner selects a route having a smaller link traffic volume or smaller power consumption, the route passing through the nodes A1, D1, and B1 has been determined to be the route of the request flow.

If the route passing through A1, D1, and B1 is set for the route of the request flow, the link traffic volume are 60 Mbps and 105 Mbps and link power consumption is 0.4 W and 3.6 W. At that time, the link power consumption between the nodes D1 and B1 increases by 3.2 (=3.6–0.4) W.

In contrast, if the route passing through A1, C1, and B1 is set for the route of the request flow, the link traffic volume are 120 Mbps and 130 Mbps and the link power consumption is 3.6 W and 3.6 w, which are unchanged.

As the above, the conventional route calculation system has a problem that the route determined for the request flow has a possibility of increasing prospective power consumption.

Furthermore, the conventional route determination determines a route using constraints on using traffic for a link used by two or more routes as constraint condition. Such constraint condition does not clearly define an allowable level for using the network to ensure the End-to-End quality of each flow carried in the network. Therefore, the route would be calculated under tough constraint condition.

Another conventional manner of determining a route retrieves all the patterns of all candidate routes, considering the end-to-end quality of the respective flows having various route lengths and quality requirements. Unfortunately, such conventional manner has a problem that a route is determined, considering the relationship between the network state, such as a node processing amount and link traffic that are fluctuating, and flow quality influence.

SUMMARY

There is provided an apparatus for determining, for a network including a number of nodes one another connected via links, a route through which a request flow between two of the nodes passes, each of the links having a characteristic of fluctuating link power consumption depending on an amount of link traffic, the apparatus including: a collector that collects a current amount of link traffic and current link power consumption of each of the links included in the network; a virtual link setter that sets, for each of the links, virtual links including a first virtual link that is capable of carrying a prospective amount of link traffic when the request flow is added and a second virtual link having a power consumption characteristic which is different from that of the first virtual link; a link cost calculator that estimates an increase in the link power consumption of each of the virtual links when the request flow is newly added based on the current amount of link traffic, the current link power consumption, bandwidth of the request flow, and the power consumption characteristic, and calculates a link cost of each of the virtual links based on the estimated increase in the link power consumption; a constraint condition setter that creates a constraint condition satisfying a requirement of end-to-end quality of the request flow based on change in quality of each of the virtual links by allocating the request flow to the virtual link, and satisfying a requirement of end-to-end quality of an existing flow based on the change in quality of the existing flow on the virtual link, the change being caused by allocating the request flow to the virtual link; and a route determinator that determines a route having a smallest sum of the link costs among a plurality of routes, including a plurality of the virtual links satisfying the constraint condition created by the constraint requirement setter, to be the route of the request flow.

There is disclosed a method for determining, for a network including a number of nodes one another connected via links, a route through which a request flow between two of the nodes passes, each of the links having a characteristic of fluctuating link power consumption depending on an amount of link traffic, the method including: collecting a current amount of link traffic and current link power consumption of each of the links included in the network; setting, for each of the links, virtual links including a first virtual link that is capable of carrying a prospective amount of link traffic when the request flow is added and a second virtual link having a power consumption characteristic different from that of the first virtual link; estimating an increase in the link power consumption of each of the virtual links when the request flow is newly added based on the current amount of link traffic, the current link power consumption, the request flow rate, and the power consumption characteristic; calculating a link cost of each of the virtual links based on the estimated increase in the link power consumption; creating a constraint condition satisfying a requirement of end-to-end quality of the request flow based on change in quality of each of the virtual links by allocating the request flow to the virtual link, and satisfying a requirement of end-to-end quality of an existing flow based on the change in quality of the existing flow on the virtual link by allocating the request flow to the virtual link; and determining a route having a smallest sum of the link costs among a plurality of routes, including a plurality of the virtual links satisfying the created constraint condition, to be the route of the request flow.

There is provided a computer-readable recording medium having stored therein a management program instructing a computer to function for determining, for a network including a number of nodes one another connected via links, a route through which a request flow between two of the nodes passes, each of the links having a characteristic of fluctuating link power consumption depending on an amount of link traffic, the program instructing the computer to execute: collecting a current amount of link traffic and current link power consumption of each of the links in the network; setting, for each of the links, virtual links including a first virtual link that is capable of carrying a prospective amount of link traffic when the request flow is added and a second virtual link having a power consumption characteristic which is different from that of the first virtual link; estimating an increase in the link power consumption of each of the virtual links when the adding of the request flow based on the current amount of link traffic, the current link power consumption, the request flow, and the power consumption characteristic; calculating a link cost of each of the virtual links based on the estimated increase in the link power consumption; creating a constraint condition satisfying a requirement of end-to-end quality of the request flow based on change in quality of each of the virtual links by allocating the request flow to the virtual link, and satisfying a requirement of end-to-end quality of an existing flow based on the change in quality of the existing flow on the virtual link by allocating the request flow to the virtual link; and determining a route having a smallest sum of the link costs among a plurality of routes, including a plurality of the virtual links satisfying the created constraint condition, to be the route of the request flow.

There is disclosed a management device that passes a request flow, for a network including a number of nodes one another connected via links, passes a request flow through a route between two of the nodes, each of the links having a characteristic of fluctuating link power consumption depending on an amount of link traffic, the device including: a collector that collects a current amount of link traffic and current link power consumption of each of the links in the network; a virtual link setter that sets, for each of the links, virtual links including a first virtual link that is capable of carrying a prospective amount of link traffic when the request flow is added and a second virtual link having a power consumption characteristic which is different from that of the first virtual link; a link cost calculator that estimates an increase in the link power consumption of each of the virtual links when the adding of the request flow based on the current amount of link traffic, the current link power consumption, the request flow, and the power consumption characteristic, and calculates a link cost of each of the virtual links based on the estimated increase in the link power consumption; a constraint condition setter that creates a constraint condition satisfying a requirement of end-to-end quality of the request flow based on change in quality of each of the virtual links by allocating the request flow to the virtual link, and satisfying a requirement of end-to-end quality of an existing flow based on the change in quality of the existing flow on the virtual link by allocating the request flow to the virtual link; a route determinator that determines a route having a smallest sum of the link costs among a plurality of routes, including a plurality of the virtual links satisfying the constraint condition created by the constraint requirement setter, to be the route of the request flow; and a transmission processor that passes the request flow through the route determined by the route determinator.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of virtual links in a network management system of the first embodiment;

FIG. 5 is a diagram illustrating an example of link cost calculating data in the network management system of the first embodiment;

FIG. 9 is a diagram illustrating an objective function and a constraint condition formula for route calculation of a request flow in a network management system of the first embodiment;

FIG. 10 is a list denoting variables and functions related to a design model in a network management system of the first embodiment;

FIG. 12 is a diagram illustrating an example of quality constraint generation data generated in a network management system of the first embodiment;

FIG. 14 is a diagram illustrating processing of a solver in a network management system of the first embodiment;

FIG. 26 is a flow diagram illustrating a succession of procedural steps of route calculating by an optimum route calculator in a network management system of the first embodiment;

FIGS. 28A and 28B are diagrams denoting a manner of calculating a power reducing index for each link when opposite links are on different traffic levels in a network management system of the first embodiment;

FIG. 29 is a diagram illustrating a relationship between a traffic volume and link power consumption.

DESCRIPTION OF EMBODIMENT(S)

(A) First Embodiment

Hereinafter, description will now be described in relation to route determination with reference to accompanying drawings.

Figure 1:
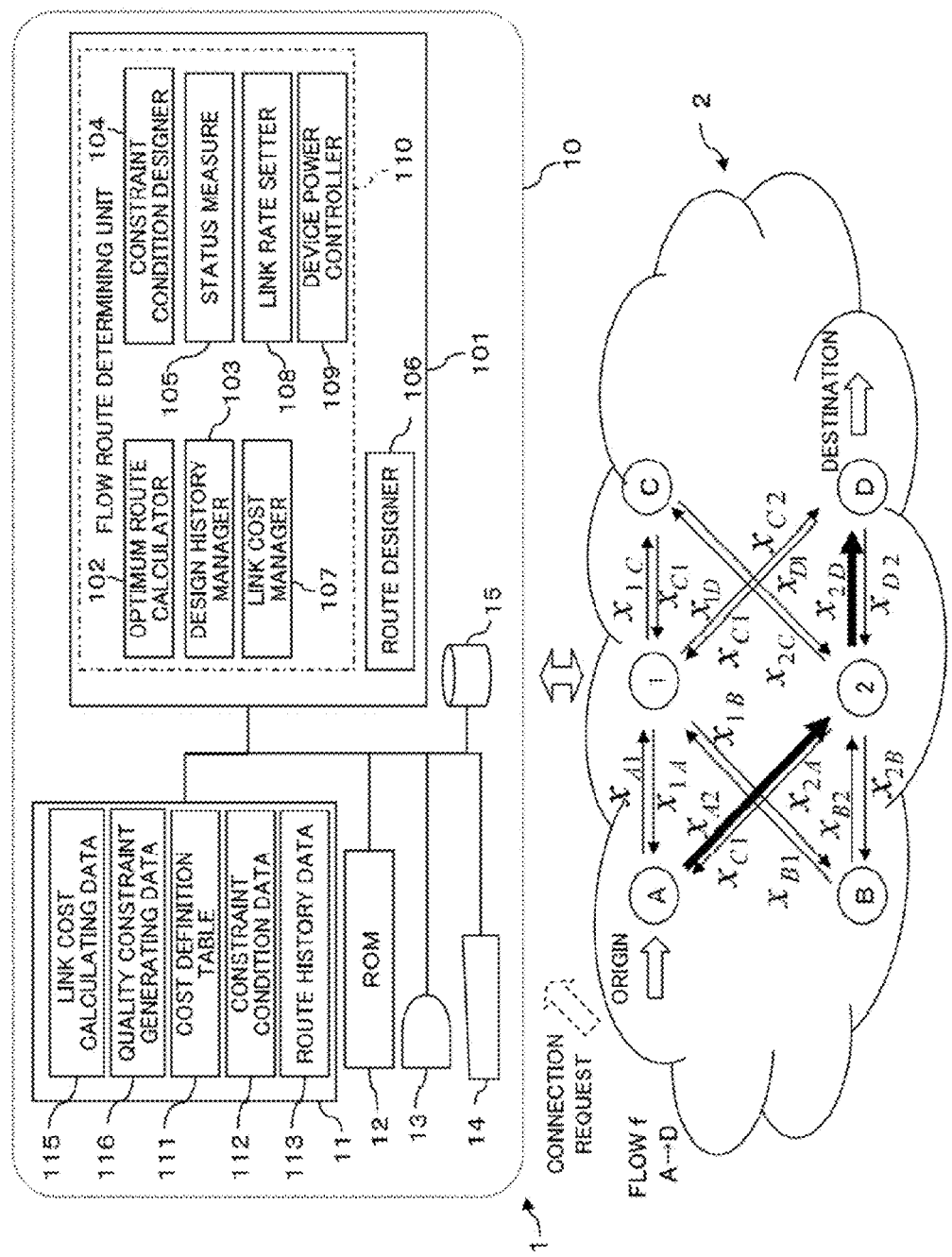
FIG. 1 is a schematic diagram illustrating the configuration of an example of a network management system according to a first embodiment.
Figure 2:
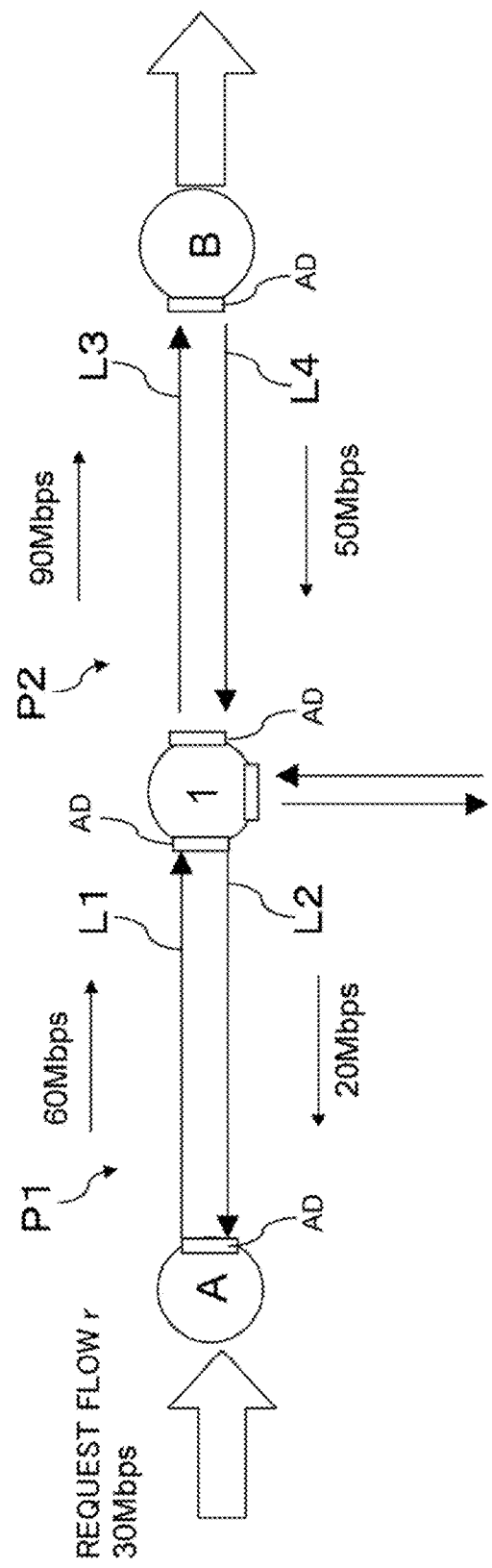
FIG. 2 is a diagram illustrating an example of the configuration of a network.
Figure 3:
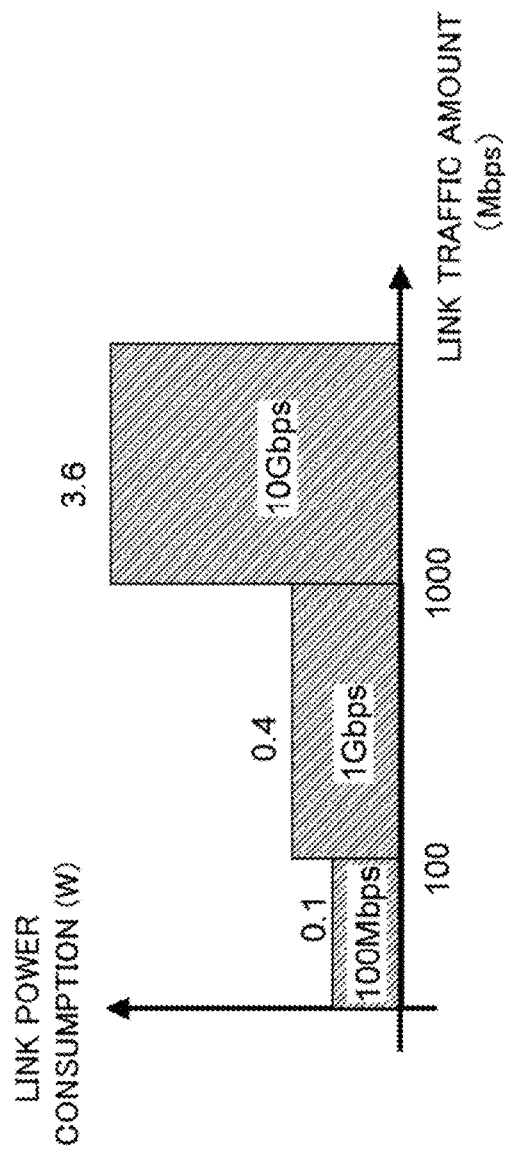
FIG. 3 is a diagram illustrating an example of an ALR characteristic.

FIG. 1 is a diagram schematically illustrating the configuration of a network management system 1 according to the first embodiment; FIG. 2 is a diagram illustrating the configuration of a network; and FIG. 3 is a diagram illustrating an ALR characteristic of the network.

The network management system 1 manages a network 2 including a number of nodes one another connected via data links, and as illustrated in FIG. 1, includes a management server 10.

The network 2 includes a number of nodes and data links that communicably connect the nodes.

A node here is a computer system that is capable of receiving data from and transmitting data to other nodes via the data links.

Each node can function as a source node that transmits data to the network 2 and can also function as a receiving node (destination node) that receives data from a source node. In addition, each node has a function of receiving data from a source node or another node and further transmitting (i.e., forwarding) the received data to another node. The first embodiment omits detailed description of the configuration or the function of the nodes.

An example of a data link is a communication line (transmission path) such as a Local Area Network (LAN) or Fiber Channel (FC). The data link here includes, in addition to a physical line that transmits data, hardware and software constitutional elements for transmitting and receiving data in a data network. Communication lines of various known standards can be applied to this data link. The first embodiment omits detailed description of the configuration and the function of the data link. Hereinafter, a data link is sometimes simply called a "link".

In the example of FIG. 1, the network 2 includes six nodes, which are represented by reference symbols and numbers of A, B, C, D, 1, and 2.

Hereinafter, these symbols and numbers to specify the nodes are called node numbers. Arbitrary node is simply called a "node" while particular one of the nodes is represented by adding the corresponding node number if required. For example, a node having a node number A is sometimes called the node A, and a node having a node number 1 is called the node 1.

In the example of FIG. 1, a data route (data link) between nodes connected via a data link is represented by a reference symbol "x", and attaching node numbers of the nodes on the both ends of the route to the reference symbol "x" represents the direction of transmitting the data. More specifically, the route and the data flow direction of a data link is represented by attaching the subscripts of, in sequence, the node number of a source node and the node number of a destination node to the reference symbol x.

For example, the reference symbol $x_{A2}$ represents a route to transmit data from the node A to the node 2, and the reference symbol $x_{2D}$ represents a route to transmit data from the node 2 to node D.

Alternatively, a data link is represented by a reference symbols (i, j) in which i and j correspond to node numbers on the both ends of the data link.

Here, as illustrated in FIG. 2, a network 2 consisting of the node A, the node 1, and the node B is assumed.

The network 2 is connected to the network management system 1, which receives a request flow (new flow) r and selects and sets a forwarding route of the request flow r in the network 2.

As illustrated in FIG. 2, the node A and the node 1 is each other connected via a physical link P1; and the node 1 and the node B is each other connected via a physical link P2. Terminals to be installed to the respective nodes are connected to the respective nodes A and B.

The physical link P1 is managed in the form of being divided into opposite logical links (links) L1 and L2 represented by arrows. In the same manner, the physical link P2 is managed in the form of being divided into opposite logical links L3 and L4 represented by arrows.

Hereinafter, particular one of the links is represented by a corresponding one from the reference number L1 through L4, while an arbitrary link may sometimes be represented by a reference symbol Lα (here, α is a natural number of 1 or more).

Each node includes a network adaptor AD, through which the node is communicably connected to another node via a physical link. Each network adaptor AD has an ALR function.

The ALR function determines a proper forwarding rate (link rate) depending on an amount of link traffic of a link having higher load between two opposite links, and further determines power consumption (throughout the specification, the wording "power" represents "electric power") to achieve the operation at the determined forwarding rate. Furthermore, the ALR function manages links (e.g., the links L1 and L2) on an identical physical link (e.g., the link P1) in association with each other. The line rate is determined based on the maximum value of amounts of link traffic of the links L1 and L2. Namely, power consumption of each of the opposite links on the same physical link is determined based on the larger amount of link traffic of the opposite links.

A link cost manager 107 of the network management system 1 has the same ALR function.

In the example of FIG. 2, the network adaptors AD provided to the nodes A, B, and 1 have the same power consumption characteristic (i.e., ALR characteristic) as illustrated in FIG. 3. In other words, the electric power characteristic of a source node and that of the destination node of each link have the same ALR characteristic.

The ALR characteristic represents a relationship between an amount of link traffic (i.e., link rate) and a link power consumption. In the ALR characteristic, a link power consumption is a discrete value and stepwisely changed with an amount of link traffic.

Specifically, the link power consumption is 0 W when an amount of link traffic of 0 Mbps; and the link power consumption is 0.1 W when an amount of link traffic in the range of 0 through 100 Mbps. Hereinafter, a range of an amount of link traffic having the same power consumption of the ALR characteristic is represented by the upper limit (in capacity) of the amount of link traffic. Namely, a range of from 0 Mpbs to 100 Mbps having the same power consumption of the ALR characteristic is called a "line having a link rate of 100 Mbps".

A range of an amount of link traffic from 100 Mbps to 1000 Mbps, that is, a line of a link rate of 1 Gbps has link power consumption of 0.4 W, which is higher than that of a line of a link rate of 100 Mbps. Furthermore, an amount of link traffic exceeding 1000 Mbps corresponds to a line having a link rate of 10 Gbps, which has link power consumption of 3.6 W that is higher than that of a line having a link rate of 1 Gbps. Hereinafter, the ALR characteristic is sometimes simply called "the characteristic". In relation to the ALR characteristic, an amount of traffic serving as a threshold to fluctuate a link power consumption (power consumption operation level) is called a rate threshold. Besides, a link rate represents a power consumption characteristic (forwarding characteristic) of a corresponding link.

Among these lines having link rates of 100 Mbps, 1 Gbps, and 10 Gbps, a line having a larger upper limit is called an "upper" line. Hereinafter, a link having a larger upper limit may sometimes be called a link of an upper link rate or an upper-rate link.

Then, a link rate setter 108 of the flow route determinator 110 that is to be detailed below switches a link rate. In other words, switching between lines having different link rates is achieved by the link rate setter 108.

The management server 10 manages transmission routes of data in the network 2 and is directly or indirectly coupled to the respective nodes in the network 2. The management server 10 functions as a route determinator that determines a route of a flow in a network 2 including a number of nodes one another connected via data links.

The management server (management device) is a computer (information processing device) having a function as a server, and includes, as illustrated in FIG. 1, a CPU 101, a monitor 13, a Random Access Memory (RAM) 11, a Read Only Memory (ROM) 12, an input device 14, and a memory 15.

The monitor 13 provides an operator with various pieces of information by displaying the pieces of information, and is exemplified by a Liquid Crystal Display (LCD) or a Cathode Ray Tube (CRT) display. The input device 14 is a device through which the operator inputs instructions and data, and is exemplified by a keyboard or a mouse.

The RAM 11 is a memory device that temporarily contains data and a program (e.g., a management program), and is further used to expand (store) data and program when the CPU 101 that is to be detailed below is to carry out calculations and control.

The RAM 11 contains a cost definition table 111, constraint condition data 112, route history data 113, link cost calculating data 115, and quality constraint generating data 116.

The cost definition table 111 contains a cost (link cost) of each data link (i, j) included in the network 2, and specifically contains each data link (i, j) and a predetermined link cost $c_{i,j}$ in association with each other. A link cost here can be obtained any known method, and the detailed description thereof is omitted here.

The constraint condition data 112 is a quality constraint condition determined by a constraint condition designer 104 that is to be detailed below. The quality constraint condition will be detailed below.

The route history data 113 is related to an optimum route calculated by an optimum route calculator 102 that is to be detailed below, and contains, in association with identification information of a flow, information of the optimum route, and the band of the flow, the quality requirement for end-to-end delay (buffering delay), and the quality requirement for the loss rate (packet loss rate). In other words, the RAM 11 functions as a route history information storing section that stores information of data links constructing the route of the flow determined by the optimum route calculator 102.

The quality constraint generating data 116 is information created when the constraint condition designer 104 determines the quality constraint condition. The quality constraint generating data 116 will be detailed below with reference to FIG. 11.

The link cost calculating data 115 expresses an increase in power (i.e., a virtual link cost) of each virtual link to be detailed below when a request flow r is added, and is created by a link cost manager 107 to be detailed below. The link cost calculating data 115 will be detailed below with reference to FIG. 5.

The RAM 11 also contains a request flow r (to be detailed below) sent from a transmission source node. Such a request flow can be read from the optimum route calculator 102, a design history manager 103, the constraint condition designer 104, and other units.

ROM 12 is a memory device that contains data and programs. Memory 15 is also a memory device that contains data and programs, and is exemplified by a Hard Disk Drive (HDD), or a Solid State Drive (SDD). The memory 15 contains programs, such as an OperatingSystem (OS), and data.

At least part of the cost definition table 111, the constraint condition data 112, the route history data 113, the link cost calculating data 115, the quality constraint generating data 116, and a request flow r may be stored in the memory 15 instead of the RAM 11.

The CPU 101 is a processing device that carries out various calculations and control through the execution of a program stored in the ROM 12 or the memory 15, and thereby achieves various functions. In the first embodiment, the CPU 101 executes a network management program to thereby function as, as illustrated in FIG. 1, the flow route determinator 110 (the optimum route calculator 102, the design history manager 103, the constraint condition designer 104, a status measure 105, a link cost manager 107, a link rate setter 108, and a device power controller 109), and a route designer 106.

Namely, as illustrated in FIG. 2, the CPU 101 in the management server 10 functions as the flow route determinator 110 and the route designer 106, so that the CPU 101 receives a request flow (a design flow, a connection request) r from a transmission source node (node A), determines an optimum route (a flow route) of the request flow, and sets the route.

A request flow r from a transmission source node includes a request flow bandwidth Br and a request flow quality requirement, in addition to the data to be transmitted. A request flow bandwidth Br is a usage bandwidth (an amount of traffic) to be used to transmit the data, and is, for example, represented in units of bps (bits per second). The request flow bandwidth Br represents an amount (an increased amount) of traffic to be increased in a data link when the request flow r flows through the data link.

A request flow requirement (quality requirement) is information representing end-to-end quality that the request flow r demands, and specifically includes a delay Dr and a loss rate Lr. The delay Dr is information representing a delay level allowed for the request flow r, and is, for example, expressed in units of sec (second) or msec (millisecond). The loss rate Lr is a loss rate of data allowed for the request flow r, and is expressed by, for example, a numeric value of 0-1. Alternatively, the loss rate may be expressed in other units, such as percentage.

The request flow bandwidth Br and the request flow quality requirement are stored in a predetermined storing region in a memory device, such as the RAM 11.

The route designer 106 sets the route (optimum route) determined by the flow route determinator 110 to transmit the request flow r through the route. The function of the route designer 106 can be achieved by any known method, and the detailed description is omitted here.

The flow route determinator 110 determines data links serving as a route based on a request flow r from a transmitting source node. Upon receipt of a flow request from the transmission source node (origin node) that wishes to add another route, the flow route determinator 110 determines the optimum route X of the request flow r. The transmission source node may be a terminal connected to the node.

As illustrated in FIG. 1, the flow route determinator 110 includes the optimum route calculator 102, the design history manager 103, the constraint condition designer 104, the status measure 105, the link cost manager 107, the link rate setter 108, and the device power controller 109.

The status measure 105 (collector) grasps a status of the network 2, and specifically measures (collects) amounts $R_{i,j}$ of forwarding traffic (amounts of traffic, and load on link traffic) of respective data links (i, j) of the network 2. The status measure 105 obtains the amounts of traffic through actually measuring the respective data links or through calculating based on the information included in the request flow r concerning the respective data links. Namely, the status measure 105 can achieve measurement of an amount $R_{i,j}$ of link traffic of each data link (i, j) using any known method.

Figure 6:
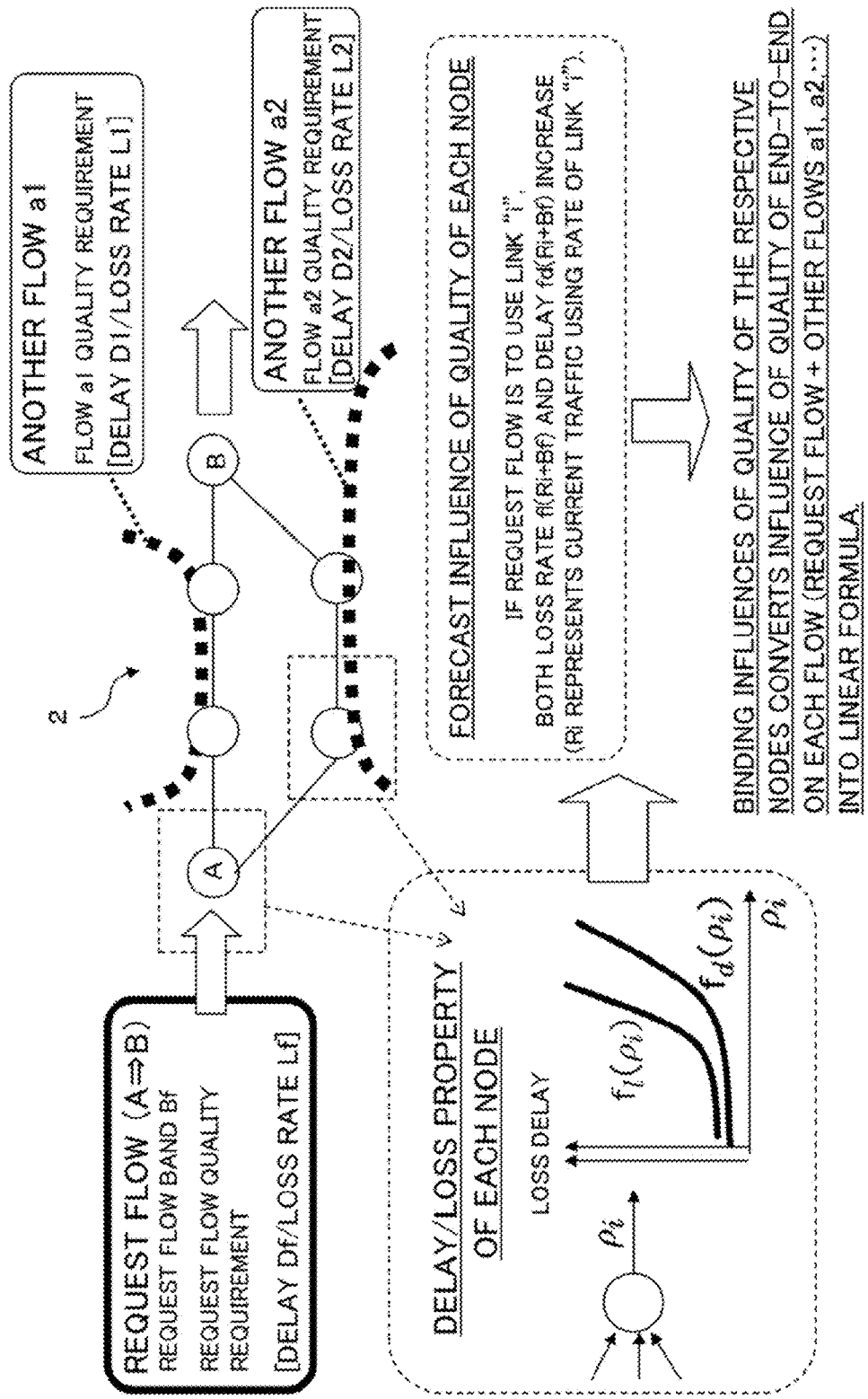
FIG. 6 is a diagram illustrating an example of a manner of setting a constraint condition by a constraint condition designer in a network management system of the first embodiment.

Furthermore, the status measure 105 stores the measured amounts of forwarding link traffic into a predetermined memory region of the RAM 11 or the memory 15 (see FIG. 6). The amounts of forwarding traffic stored in the RAM 11 are read by the constraint condition designer 104 that is to be detailed below, which uses the read amounts to set constraint condition.

Further, the status measure 105 collects a current amount of link traffic and a current link power consumption of each of the links in the network 2, and the total amount of traffic and the power consumption of a destination node. The various pieces of data collected by the status measure 105 are managed by the link cost calculating data 115 that is to be detailed below.

The link cost manager 107 estimates an amount of traffic and link power consumption of each of links to be increased when a flow setting request is generated, calculates power increase when the request flow passes through the respective links, and finally sets respective link costs.

The link cost manager 107 calculates an power increase (i.e., a link cost) of each virtual link.

A virtual link is a link virtually set as a candidate for a route of the request flow r, and one virtual link is provided for each link between two arbitrary nodes. Specifically, two types of virtual link are set for each link: a virtual present link (Linkα_p; first virtual link) having a forwarding rate (present rate) capable of carrying a current amount of traffic, that is, an amount of traffic of the request flow r based on the ALR characteristics; and a virtual upper link (Linkα_u; second virtual link) having an upper link than that of the corresponding virtual present link.

Namely, a virtual present link Linkα_p having a capacity of carrying an amount of traffic as adding the request flow r is set to be a route candidate of the request flow r, and additionally, a virtual upper link Linkα_u having an upper rate than that of the virtual present link is also set to be another route candidate.

Namely, the link cost manager 107 functions as a virtual link setter that sets, for each link, a virtual link that is capable of carrying an amount of link traffic when a request flow is added; and a virtual upper link having a forwarding characteristic which is different in link power consumption from that of the corresponding virtual present link.

In addition, the link cost manager 107 functions as a link cost calculator that estimates an increase in the link power consumption of each virtual link when the request flow is added on the basis of a current amount of link traffic, a link power consumption, the request flow, and the ALR characteristic, and calculates a link cost based on the estimated increase in the link power consumption.

Hereinafter, the virtual present link Linkα_p and the virtual upper link Linkα_u may sometimes be simply referred to as links Linkα_p and Linkα_u, respectively.

FIG. 4 is a diagram illustrating an example of virtual links in the network management system 1 of the first embodiment. The example of FIG. 4 depicts virtual links generated based on the respective links in the network configuration of FIG. 2.

In the example of FIG. 4, two virtual links are set for a link L1: Link1_p having a forwarding rate (link rate) capable of carrying the current traffic volume of 60 Mbps; and Link1_u having an upper link rate than that of Link1_p (i.e., α=1).

In the same manner, links Link2_p and Link2_u are set for a link L2; links Link3_p and Link3_u are set for a link L3; and links Link4_p and Link4_u are set for a link L4.

Then, the link cost manager 107 calculates power increases (i.e., virtual link costs) when the request flow r is added to create the link cost calculating data 115.

FIG. 5 is a diagram denoting an example of the link cost calculating data 115 in the network management system 1 of the first embodiment. The example of FIG. 5 assumes that a request flow r of 30 Mbps is to be added to the network 2 of FIG. 4, and that the nodes A, B, and 1 have the ALR characteristic of FIG. 3.

As denoted in FIG. 5, the link cost calculating data 115 includes, for each link, destination node; amount of link traffic; maximum traffic volume of a physical link; physical link rate; link power consumption; virtual link; link traffic volume when new flow is added; and maximum traffic volume of physical link when new flow is added. Additionally, the link cost calculating data 115 includes, for each virtual link, virtual link rate; link power consumption of the virtual link; and virtual link cost.

Here, a link traffic volume corresponds to a current, in other words, before a request flow r is added, amount of link traffic (see FIG. 4). A maximum traffic volume of a physical link corresponds to the larger amount of link traffic between those of two of the opposite links on the corresponding physical link.

A physical link rate corresponds to a link rate which has the smallest link power consumption but which is capable of carrying the maximum amount of traffic of the physical link under the ALR characteristic of the node. A link power consumption is one at the physical link rate described above and is expressed by the sum of power consumption at the source and the destination nodes of the link. In other words, a link consumption rate is a sum of power consumption for the physical link rate at the source node and power consumption for the physical link rate at the destination node.

These pieces of information (data) are obtained by, for example, the status measure 105, and then stored in the link cost calculating data 115.

The virtual link is one set for the respective corresponding link. The amount of link traffic when a new flow is added is an amount of link traffic when a request flow r is added to the above amount of link traffic (i.e., the current amount of link traffic).

The maximum amount of traffic of a physical link when new flow is added is a larger amount of link traffic obtained as a result of the comparison between the amount of link traffic of a physical link when a new flow is added described above and a current amount of link traffic in the opposite direction of the same physical link.

A virtual link rate is the upper limit of a link rate of the corresponding virtual link. Specifically, a virtual link rate of a virtual present link Linkα_p is a link rate which has the lowest link power consumption that is capable of carrying a prospective amount of link traffic of the corresponding link when the request flow is added; and a virtual link rate of a virtual upper link Linkα_u is a link rate that is one-level higher than that of the corresponding virtual present link Linkα_p.

A link power consumption of a virtual link is a sum of power consumption of the source and the destination nodes of a corresponding link. Namely, a link power consumption is a link power consumption of each physical link. A link power consumption of a virtual link is a sum of power consumption for the virtual link rate at the source node of a link and power consumption for the virtual link rate at the destination node of the same link.

A virtual link cost is a difference between power consumption of each virtual link when a new flow is added and the current link power consumption of the same virtual link.

Here, power consumption is not changed on a virtual link having a link rate corresponding to the link traffic volume when a request flow is added. If a virtual link has power consumption when a new flow is added the same as the current link power consumption, the corresponding link cost is set to be a minute value δ (e.g., 0.001) to represent that the power consumption is unchanged.

In contrast, if the link rate of a virtual link needs to be changed to an upper rate in order to comply with the prospective link traffic when the request flow is added, the virtual link is to have a change in power consumption caused by the rate change.

For example, a request flow of 30 Mbps from the node A to the node B is assumed to occur in the example of FIGS. 3-5.

Description will now be made in relation to an example of calculating a link cost of the link L1. Currently, data is being forwarded through the link L1 at 60 Mbps and through the link L2 at 20 Mbps. Under the current circumference, both links L1 and L2 are set to be at 100 Mbps, which corresponds to a line rate capable of forwarding an amount of link traffic at 60 Mbps of the link L1 having a higher load. At that time, the source node A the link L1 consumes 0.1 W and the destination node 1 consumes 0.1 W, so that the current amount of link power consumption of the link L1 is 0.2 W in total.

Next, a virtual present link Link1_p and a virtual upper link Link1_u that are based on the link L1 are to be set (assumed).

Firstly, when a request flow of 30 Mbps is to be added to a virtual present link Link1_p, the virtual present link Link1_p is to forward data at 90 Mbps. For this purpose, the virtual present link Link1_p is set to have a virtual link rate of 100 Mbps for satisfying forwarding at an amount of link traffic of 90 Mbps.

Accordingly, the virtual present link Link1_p maintains the total power consumption of 0.2 W due to the power consumption of 0.1 W at the source node A and the power consumption of 0.1 W at the destination node, and therefore has no increase in power consumption even when the link L1 newly carries the request flow. Consequently, the link cost of the link L1 is set to be δ (minute value).

In contrast, the virtual upper link Link1_u is set to have a one-level higher link rate than that of the virtual present link Link1_p under the ALR characteristic, i.e., set to have a link rate of 1000 Mbps.

Accordingly, the virtual upper link Link1_u maintains the total power consumption of 0.8 W due to the power consumption of 0.4 W at the source node A and the power consumption of 0.4 W at the destination node, and therefore the power consumption of the virtual upper link Link1_u, which newly carries the request flow r, increases by (0.8-0.2) W. Consequently, the link cost of the virtual upper link Link1_u is 0.6.

In the above manner, the link cost manager 107 estimates prospective increases in power when a request flow r passes through a virtual present link (virtual link variable) that is capable of carrying an amount of link traffic and through a virtual upper link (upper link variable) having an upper rate than that of the virtual present link, and sets the estimated increases to be the respective link costs.

The link cost manager 107 stores the created or updated link cost calculating data 115 into a predetermined region of the RAM 11.

The constraint condition designer (constraint condition setter) 104 sets a constraint condition to be used for route determination by the optimum route calculator 102 to be detailed below.

The constraint condition designer 104 estimates amounts of quality change of all the virtual links (link variables) using the current amount of traffic and the band information of the request flow, and designs constraint condition formulae of the request flow and another existing flow already set, using the quality requirements provided for the respective flows.

Besides, the constraint condition designer 104 designs constraint condition formulae for the request flow r and another existing flow already set, using a current amount of traffic of a data link, the bandwidth information of the request flow r, and the quality requirements provided for the request flow and the existing flow(s) in the network 2.

The constraint condition designer 104 estimates end-to-end quality influences of the request flow r and existing flow in the network 2 based on the influence of the request flow r on the traffic of the respective data links. The constraint condition designer 104 sets linear constraint equations related to the end-to-end quality of the request flow r and the existing flow to be the constraint condition.

Namely, based on the relationship models between "load and delay" and between "load and a packet loss rate" of the respective data links in the network 2, the constraint condition designer 104 approximates and formulates end-to-end loss rates and delays of the request flow and the existing flow into linear equations.

FIG. 6 is a diagram denoting an example of a manner to set a constraint condition by the constraint condition designer 104 in the network management system 1 of the first embodiment. In FIG. 6, an example of the topological configuration of the network 2 is schematically illustrated.

The example of FIG. 6 assumes that a new request flow r from the node A to the node B is requested to be set (flow setting request) under the environment of two flows a1 and a2 being already set (i.e., existing flows).

Here, an existing flow a1 already set is provided with a delay D1 for the quality requirement for end-to-end delay and with a loss rate L1 for the quality requirement for an end-to-end loss rate. Similarly, an existing flow a2 already set is provided with a delay D2 for the quality requirement for an end-to-end delay and with a loss rate L2 for the quality requirement for end-to-end loss rate.

Furthermore, the request flow r is provided with a using bandwidth Br, end-to-end delay quality requirement Dr, and end-to-end loss rate quality requirement Lr when a request to set the flow is issued.

The constraint condition designer 104 determines constraint conditions of the request flow r, the conditions considering "quality of the request flow" and "quality influence on existing flows" that the optimum route calculator 102 to be detailed below is to use to determine a route having the smallest sum of link costs.

A constraint condition considering "quality of the request flow" is satisfaction of quality requirements for end-to-end delay and end-to-end loss rate of the request flow.

A constraint condition considering "quality influence on existing flows" is satisfaction of quality requirements for end-to-end delay and end-to-end loss rate of the respective existing flows. Specifically, the constraint condition needs to satisfy end-to-end delay and an end-to-end loss rate of the flow a1 and satisfaction of end-to-end delay and an end-to-end loss rate of the flow a2.

In the illustrated example, the constraint condition designer 104 sets the above constraint conditions in the form of linear formulae, and the optimum route calculator 102 calculates an optimum route of the request flow r through a kind of linear programming problem.

Specifically, the constraint condition designer 104 estimates and manages the characteristics of "load and buffering delay of link traffic" and "link traffic load and a loss rate" of the respective nodes. Here, the characteristics of "link traffic load and buffering delay" and "an amount of link traffic and a loss rate" can be obtained by, for example, a quality change forecasting function, such as a queuing model typically exemplified by M/M/1/K.

In other words, the constraint condition designer 104 has a function as a quality influence estimator that estimates quality influence (end-to-end quality influence) of allocation of a request flow r to a data link.

Figure 7:
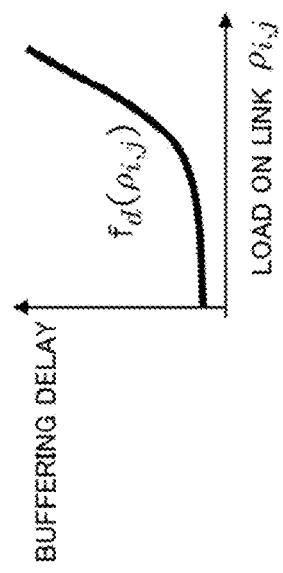
FIG. 7 is a diagram illustrating a relationship between a link traffic load and buffering delay.
Figure 8:
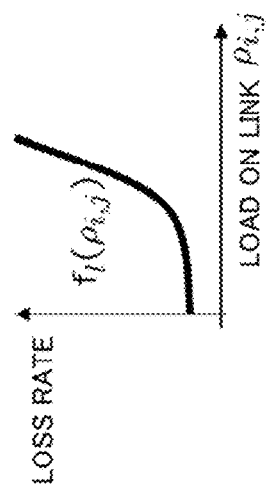
FIG. 8 is a diagram illustrating a relationship between a link traffic load and a loss rate.

FIG. 7 is a diagram illustrating a relationship between link traffic load (link load) and buffering delay; and FIG. 8 is a diagram illustrating a relation ship between link traffic load (amount of link traffic) and a loss rate.

As illustrated in FIG. 7, buffering delay is represented by a characteristic function $f_d$ of a link traffic load. As illustrated in FIG. 8, a loss rate is represented by a characteristic function $f_l$ of a link traffic load.

For example, the buffering delay $f_d$ and the loss rate $f_1$ are expressed by the following formulae (1) and (2), respectively.

In the formulae, K (in units of packet) represents a buffer length of a network device; data (in units of bit) represents an average packet length; and $c_{i,j}$ (in units of bps) represents a rate of a virtual link (i, j). Here, the rate $C_{i,j}$ of a virtual present link is different from that of a corresponding virtual upper link. Besides, the load of each virtual link (i, j) is represented by $\rho_{i,j}$ [0-1], which is calculated as an amount of forwarding traffic (in units of bps)/$C_{i,j}$.

$$f_d(\rho_{i,j}) = \frac{\text{data}}{C_{i,j}} \left\{ \frac{1 - \rho_{i,j}^{K-1}}{(1 - \rho_{i,j})(1 - \rho_{i,j}^{K+1})} - \frac{K\rho_{i,j}^K}{(1 - \rho_{i,j}^{K+1})} \right\} \quad (1)$$

$$f_l(\rho_{i,j}) = \frac{\rho_{i,j}^K (1 - \rho_{i,j})}{1 - \rho_{i,j}^{K+1}} \quad (2)$$

Furthermore, assuming that the request flow r flows through each virtual link, amounts of quality change in buffering delay and loss rate (i.e. end-to-end quality influence) are estimated using the characteristic model. Specifically, an amount of quality change in buffering delay is represented by the following buffering delay forecasting function (3)

$$f_d(R_{i,j} + Br) \quad (3)$$

Similarly, an amount of quality change in loss rate is represented by the following loss rate forecasting function (4).

$$f_1(R_{i,j} + Br) \quad (4)$$

Here, the term $R_{i,j}$ represents an amount of forwarding traffic (in units of bps) of a data link (i, j), that is, a current load of the data link (i, j). Accordingly, when the request flow r uses the data link (i, j), the following relationships are established:

increase in delay=$f_d(R_{i,j} + Br)$ increase in loss rate=$f_1(R_{i,j} + Br)$

Namely, the constraint condition designer 104 estimates end-to-end quality influence of the request flow and the existing flows by applying the influence of the flow on the traffic of the data link to the quality change forecasting functions.

In the first embodiment, the optimum route calculator 102 obtains an optimum route by calculating whether the request flow r is to pass through a link from each node i to the node j ($X_{ij}$=1) or not ($X_{ij}$=0) through mathematical calculation in order to obtain a design variable $x_{i,j}$.

Accordingly, a constraint condition to derive the design variable ($X_{ij}$) needs to be provided in the form of a formula using the design variable ($X_{ij}$). End-to-end delay and end-to-end loss rate can be formulated using amounts of quality change forecasted for each individual node and the design variable ($X_{ij}$).

FIG. 9 is a diagram denoting an example of an objective function and a constraint condition formula that are to be used to calculate a route of a request flow in the network management system 1 of the first embodiment. FIG. 10 is a list of variables and functions related to a design model in the network management system 1 of the first embodiment.

Hereinafter, in various variables such as $X_{ij}^{lr}$, the symbol lr represents a virtual present link Link1_$p$ or a virtual upper link Link1_$u$ of the data link (i, j). Therefore, lr=p represents a virtual present link Link1_$p$ or lr=u represent a virtual upper link Link1_$u$.

In digraph G={V, E} (V represents sets of node, and E represents sets of links), a link variable of a standard rate of a data link (i, j) is defined as:

$$X_{ij}^p \in \{0,1\}$$

Similarly, a link variable of an upper link of the data link (i, j) is defined as:

$$X_{ij}^a \in \{0,1\}$$

Under the definitions, an objective function to determine a lowest-cost route that the path r passes is set as the following formula (5).

$$\min \sum_{lr \in \{p,u\}} \sum_{(i,j) \in E} c_{ij}^{lr}(R_{ij} + B_r) \cdot X_{ij}^{lr} \quad (5)$$

Here, a link cost function $$c_{ij}^{lr}(R_{ij}+B_r)$$

is defined as an "increase in power consumption when a path r passes through a link (i, j) at respective link rates" using an amount Rij (bps) of forwarding traffic through the link (i, j) and the using band Br (bps) of the path r.

Accordingly, the lowest-cost route determined by allocating link costs is equal to a route having the smallest increase in power consumption.

The solutions to this problem represents the following:
The solutions of this problem represents the following:
when both $X_{ij}^p$=1 and $X_{ij}^a$=0 are established, the path r passes through the link (i, j) and the rate of the link (i, j) is unchanged;
when both $X_{ij}^p$=0 and $X_{ij}^a$=1 are established, the path r passes through the link (i, j) and the rate of the link (i, j) is changed to an upper rate; and
when both $X_{ij}^p$=0 and $X_{ij}^a$=0 are established, the path r passes through link (i, j) and the rate of the link (i, j) is unchanged.

Figure 11:
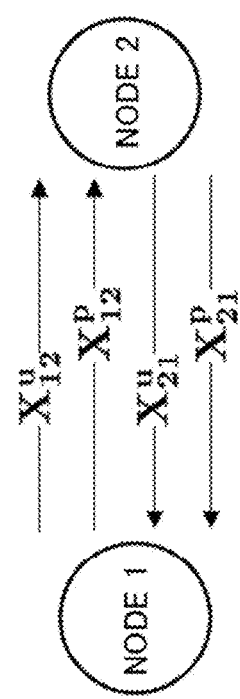
FIG. 11 is a diagram illustrating design variables in a network management system of the first embodiment.

An example of setting the above design variables is denoted in FIG. 11, which assumes i=1 and j=2.

The above objective function (5) derives a design variable ($X_{ij}$) that minimizes the sum of link costs.

The constraint condition designer 104 sets the following constraint condition of the objective function.

(1) flow conservation law:
The following constraint condition formula (6) is set based on a flow conservation law that an amount of traffic input into a node is the same as an amount of traffic output from the same node.

$$\sum_{lr \in \{p,u\}} \left( \sum_j X_{(ij)}^{lr} - \sum_j X_{(ji)}^{lr} \right) = \begin{cases} 1 & \forall i = s \\ -1 & \forall i = d \\ 0 & \forall i \neq s, d \end{cases} \quad (6)$$

(2) hop-length constraint:
The following constraint condition formula (7) is set based on hop-length constraint that the number of hops for a demand is a predefined number H or less.

$$\sum_{lr \in \{p,u\}} \sum_{(i,j) \in E, i \neq j} X_{i,j}^{lr} \leq H \quad (7)$$

(3) quality constraint:
A route of the request path r having a smallest increase in power consumption of the entire network is determined such that the quality requirements {$D_r$, $L_r$} and {$D_k$, $L_k$} for the end-to-end delay and the end-to-end loss rates of the request path r and existing paths k (k=1, 2, . . . ) are satisfied, considering the requirements for the end-to-end delay and the loss rates of the respective paths. The end-to-end delay and the end-to-end loss rates of the request path r and existing paths k can be expressed as the following linear constraint formulae (8) and (9) using an amounts $T_{ij}$ (bps) of forwarding traffic of the respective links (i, j), a buffering delay function $f_d^{lr}(T_{ij})$ and the loss rate function $f_l^{lr}(T_g)$ when the link rate is lr∈{p, u}.

(3-1) quality constraint condition of the request flow r:

end-to-end delay (8)

$$\sum_{lr \in \{p,u\}} \sum_{(i,j) \in E, i \neq j} f_d^{lr}(R_{ij} + B_r) \cdot X_{ij}^{lr} \leq D_r$$

end-to-end loss rate (9)

$$\sum_{lr \in \{p,u\}} \sum_{(i,j) \in E, i \neq j} f_l^{lr}(R_{ij} + B_r) \cdot X_{ij} \leq L_r$$

In above formula (8), $f_g^{lr}(R_{i,j}+B_r)$ represents an increase in delay of the request flow r itself on the respective virtual links. Similarly, $f_l^{lr}(R_{i,j}+B_r)$ in above formula (9) represents an increase in loss rate in the request flow r on the respective virtual links.

(3-2) quality constraint condition of the existing path k (k=1, 2 . . . ):
The symbol k represents information to identify a flow and is a natural number of 1 or more.

$$\sum_{lr \in \{p,u\}} \sum_{(i,j) \in E, i \neq j} \{(f_d^{lr}(R_{ij} + B_r) - f_d^p(R_{ij}))Y_{ij}^k\} \cdot X_{ij}^{lr} \leq D_k - f_d^p(R_{ij})Y_{ij}^k \quad (10)$$

$$\sum_{lr \in \{p,u\}} \sum_{(i,j) \in E, i \neq j} \{(f_l^{lr}(R_{i,j} + B_r) - f_l^p(R_{ij}))Y_{ij}^k\} \cdot X_{ij}^{lr} \leq L_k - f_l^p(R_{ij})Y_{ij}^k \quad (11)$$

Here, the term $Y_{ij}^k \in \{0,1\}$ represents a forwarding route of an existing path k. The functions $f_d^{lr}(T_{ij})$ and $f_l^{lr}(T_g)$ deal with a queuing model (M/M/1/K), a measured model, and the like. For example, when an M/M/1/K model is applied, the functions $f_d^{lr}(T_{ij})$ and $f_l^{lr}(T_{ij})$ can be respectively represented by the following formulae (12) and (13) using a buffer length K (packets), an average packet length data (bits), a link rate $L_{i,j}$ (bps) of each link $l r\in\{p,u\}$, and the corresponding link load $\rho_{i,j}=T_{ij}/L_{ij}$ ($0\le\rho\le 1$) of an objective network device.

$$f_d^{lr}(T_{ij}) = \frac{\text{data}}{L_{i,j}}\left\{\frac{1-\rho_{i,j}^{K-1}}{(1-\rho_{i,j})(1-\rho_{i,j}^{K+1})} - \frac{K\rho_{i,j}^{K}}{(1-\rho_{i,j}^{K+1})}\right\} \quad (12)$$

$$f_l^{lr}(T_{ij}) = \frac{\rho_{i,j}^{K}(1-\rho_{i,j})}{1-\rho_{i,j}^{K+1}} \quad (13)$$

In the above quality constraint, the term $f_d^{lr}(R_{i,j}+B_r)-f_d^p(R_{i,j})$ represents an increase in delay of an objective flow affected by the request flow r, while the term $f_d^p(R_{i,j})$ represents a current link delay of the objective flow. Similarly, $f_l^{lr}(R_{i,j}+B_r)-f_l^p(R_{i,j})$ represents an increase in loss of an objective flow affected by the request flow r, while the term $f_l^p(R_{i,j})$ represents a current link loss of the objective flow.

The above route calculation problem entirely treats linear formulae, which can be regarded as a 0-1 integer programming problem to derive an optimum design variable ($X_{ij}$).

The above quality constraint condition created by the constraint condition designer 104 is stored, as the constraint condition data 112, in the RAM 11.

FIG. 12 is a diagram illustrating an example of the quality constraint generating data 116 generated by the network management system 1 of the first embodiment. The example of FIG. 12 depicts the quality constraint generating data 116 related to the network 2 of FIG. 2 in a table form.

The quality constraint generating data 116 is created when the constraint condition designer 104, which is detailed above, sets the quality constraint condition. The constraint condition designer 104 sequentially stores the created quality constraint generating data 116 in a predetermined region in the RAM 11.

In the example of FIG. 12, the quality constraint generating data 116 stores, for each link, source node, amount of link traffic, physical link rate, buffering delay, loss rate, virtual link, amount of link traffic when a new flow is added. In addition, the quality constraint generating data 116 includes, for each virtual link, virtual link rate, buffering delay when a new flow is added, and a loss rate when a new flow is added.

In the FIG. 12, items the same as or the substantially same as those detailed above are the same as or the substantially same as the above, so the detailed description is omitted here.

A buffering delay and a loss rate are calculated by, for example, the constraint condition designer 104 applying a current amount of link traffic to functions $f_d(\rho_{i,j})$ and $f_l(\rho_{i,j})$ which are related to a queuing model typically represented by M/M/1/K and which are described as the above formulae (1) and (2).

The quality constraint generating data 116 contains these pieces of data (quality constraint characteristics) for each data link in the network 2.

Upon receipt of a flow request r from an origin node (which may be a terminal connected to the node) that wishes to add a new route, the optimum route calculator (route determinator) 102 determines a route which satisfies the quality constraint condition of a flow request r and that of existing flows and which has the smallest sum of cost of all links (virtual links) defined in the cost definition table 111 on the route to be the optimum route $X \in \{0,1\}$.

In other words, the optimum route calculator 102 determines virtual links that create the route for the request flow from a number of virtual links such that the constraint condition is satisfied.

Specifically, the optimum route calculator 102 derives a design variable ($X_{ij}^{lr}$) that minimizes the sum of link cost using the above objecting function (5).

Figure 13:
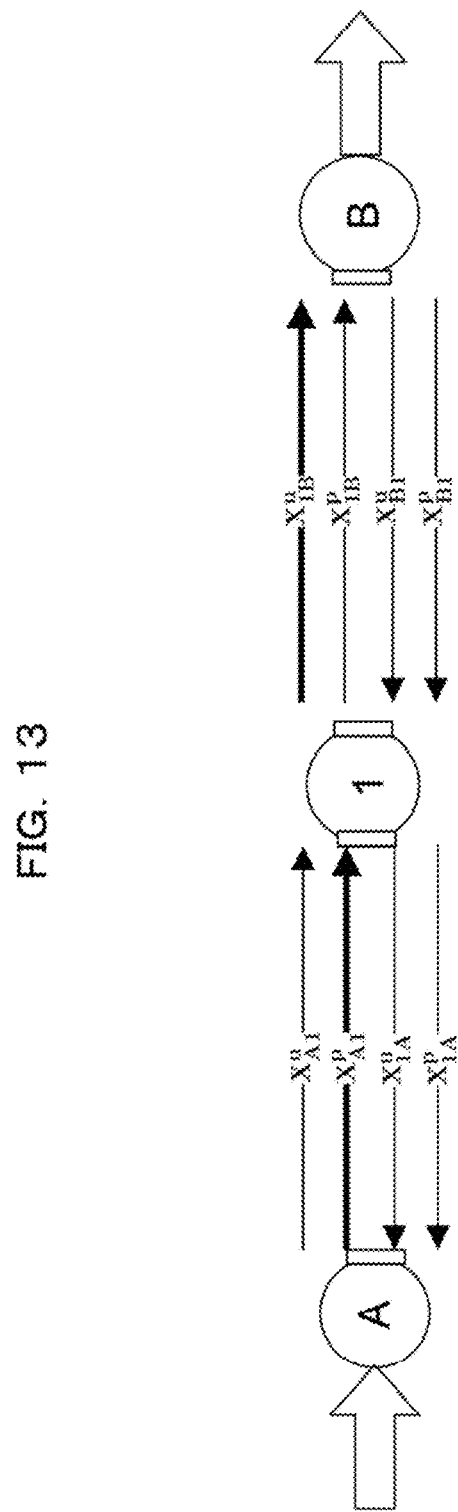
FIG. 13 is a diagram denoting a manner of expressing an optimum route in a network management system of the first embodiment.

FIG. 13 is a diagram illustrating an example of a manner of expressing the optimum route in the network management system 1, and specifically illustrating a network topology of virtual links in the network 2 of FIG. 2.

The optimum route X is expressed by enumerating all the virtual links in the network 2, setting "1" for selected data routes and setting "0" for unselected data routes as follows.

For example, the link information between nodes in the network topology of FIG. 13 is expressed by:

link variable $$X = \{X_{A1}^p, X_{A1}^u, X_{1A}^p, X_{1A}^u, X_{B1}^p, X_{B1}^u, X_{1B1}^p, X_{1B}^u\}$$

$$X \in \{0, 1\}.$$

The flow route determinator 110 determines the link variable (0: link that the request flow does not pass, and 1: link that the request flow passes) each time a request flow is provided.

For example, in the network topology of FIG. 13, a route that passes through a link $X_{41}^p$ serving as a virtual present link Link1_$p$ of the physical link P1 and also through a link $X_{1B}^u$ serving as a virtual upper link Link1_$u$ of the physical link P2 is expressed by $X=\{1,0,0,0,0,0,0,1\}$.

The optimum route calculator 102 calculates the optimum route X by solving the route calculating program that is derived in the form of linear formulae, being regarded as 0-1 integer programming problem, to calculate an optimum design variable ($X_{ij}$).

The optimum route calculator 102 determines the optimum route X using, for example, any known solver.

A solver is an application program that solves a linear programming and an integer programming problem based on the structure thereof. Examples of such a solver are GLPK, SCIP, lp_solve, OpenOpt.

The Examples of such a solver are referred on the following sites:

http://www.gnu.org/software/glpk/, http://scip.zib.de/, http://Ipsolve.sourceforge.net/5.5/, http://www.okada.jP.org/RWiki/index.PhP?R%A4% C7%BF%F4%CD%FD%B7%D7%B2%E8, https://projects.coin-or.org/CIP, and http://openopt.org/Welcome The solver that the optimum route calculator 102 uses should by no means be limited to the above, but may alternatively be modified.

Here, description will now be made in relation to a procedure of solving a 0-1 integer programming problem using lp_solve on statistical computation software called R as an example of a solver used in the network management system 1.

The statistical computation software R is referred on the following site:

http://www.okada.jp.org/RWiki/?R%A4%C7%BF% F4%CD%FD%B7%D7%B2%E8#h57b4eda

An example of the 0-1 integer programming problem here has:

$$x+9y+3z \quad \text{[objective function]}$$

$$x+2y+3z<=9 \quad \text{[constraint conditions]}$$

$$3x+2y+2z<=15.$$

The above objective function obtains f.obj←c(1, 9, 3); and the above constraint conditions obtain
f.con←matrix (c(1, 2, 3, 3, 2, 2), nrow=2, byrow=TRUE)
f.dir←c("<=", "<=")
f.rhs←c(9, 15).
lp ("max", f.obj, f.con, f.dir, f.rhs, all.bin=T) $solution
In the illustrated example, the solution "1, 1, 1" is output in the vector form, which represents the solution of x=1, y=1, and z=1.

FIG. 14 is a diagram illustrating an example of processing of the solver in the network management system 1 of the first embodiment.

In the network 2 of FIGS. 2-5 and 13, the objective function (5) obtains:

$$f.obj = c(X_{A1}^p, X_{A1}^u, X_{1A}^p, X_{1A}^u, X_{B1}^p, X_{B1}^u, X_{1B1}^p, X_{1B}^u)$$

$$= c(\delta, 0.6, \delta, 0.6, 0.6, 7, \delta, 0.6).$$

Based on the constraint conditions of the formulae (6)-(11), f.con, f.dir and f.rhs are obtained.
lp ("max", f.obj, f.con, f.dir, f.rhs, all.bin=T) $solution
As a result of the above, the link variable $$X = \{X_{A1}^p, X_{A1}^u, X_{1A}^p, X_{1A}^u, X_{B1}^p, X_{B1}^u, X_{1B1}^p, X_{1B}^u\}$$

$$= \{1, 0, 0, 0, 0, 0, 0, 1\}$$

is obtained.

The optimum route calculator 102 determines a link variable (0: link that the request flow does not pass, and 1: link that the request flow passes) when a request flow is provided.

In other words, the optimum route calculator 102 determines the route of the request flow r based on the solution of the solver. In the above example, the optimum route calculator 102 determines a route that passes through the link $X_{A1}^p$ serving as a virtual present link Link1_p of the physical link P1 and the link $X_{1B}^u$ serving as the virtual upper link Link1_u of the physical link P2 to create the route from the node A through the node 1 to the node B, as the thick arrow of FIG. 13 depicts.

The link rate setter 108 switches a link rate. The switch of a link rate is accomplished by, for example, switching the setting of network adaptor ADs of the respective nodes coupled to the objective link. The changing a link rate by the link rate setter 108 can be achieved by any known method, and the detailed description thereof is omitted here.

The link rate setter 108 changes the rate of a link whose link rate to be changed and which is obtained as a design solution.

The device power controller 109 controls switching power-saving operational levels of the respective nodes in the network 2. Specifically, the device power controller 109 switches the power-saving operational levels of each node to set to a link rate of a virtual link determined by the optimum route calculator 102. For example, if a virtual link determined by the optimum route calculator 102 includes the virtual upper link Link1_u, the power-saving operational levels of the nodes corresponding to the virtual upper link Link1_u are changed to an upper rate value considering the ALR characteristic.

Based on the result of calculating a route by the optimum route calculator 102, the route designer (transmission processor) 106 puts the request flow r into the determined route in the network 2 and passes (transmits) the request flow r through the determined route.

The design history manager 103 manages the route data of an existing flow already set in the network 2, the using bandwidth, the quality requirements about end-to-end delay and loss rate of the exiting flow.

The design history manager 103 stores the information about the optimum route determined by the optimum route calculator 102 as the route history data 113 into the RAM 11. Specifically, the design history manager 103 stores the identification data to identify a request flow f and the optimum route X of the request flow f obtained by the optimum route calculator 102 in the route history data 113 in association with each other.

For example, the optimum route X={1,0,0,0,0,0,0,1} obtained by the optimum route calculator 102 is stored as $y^{(k)}$={1,0,0,0,0,0,0,1} in the route history data 113.

The design history manager 103 stores the using bandwidth $B_r$, the quality requirement $D_r$ of end-to-end delay, and the quality requirement $L_r$ of loss rate of the request flow r; and the using band $B_k$, the quality requirement $D_k$ of end-to-end delay, and the quality requirement $L_k$ of loss rate of a flow k in the route history data 113, and manages the stored data. Namely, the quality constraint generating data 116 created for the request flow r is stored to be the route history data 113.

The data managed by the design history manager 103 is used, when another request flow r is issued, as data of existing flows already set to determine the optimum route for the request flow r.

In particular, destination node, amount of link traffic, physical link rate, buffering delay, and loss rate included in the quality constraint generating data 116 are stored in the route history data 113 in the RAM 11. This can substitute the route history data 113 for measurement by the status measure 105, which makes it possible to speed up the process and also reduce the load on the CPU 101. In detail, in determining a route of a new flow, the constraint condition designer 104 uses the route history data 113 stored in the RAM 11 to estimate influence on end-to-end quality of an existing flow.

After the completion of the processing of the flow, data about the processed flow may be deleted from the route history data 113.

The constraint condition designer 104 deletes the constraint condition for calculating route, each time a route deviation occurs.

Figure 15:
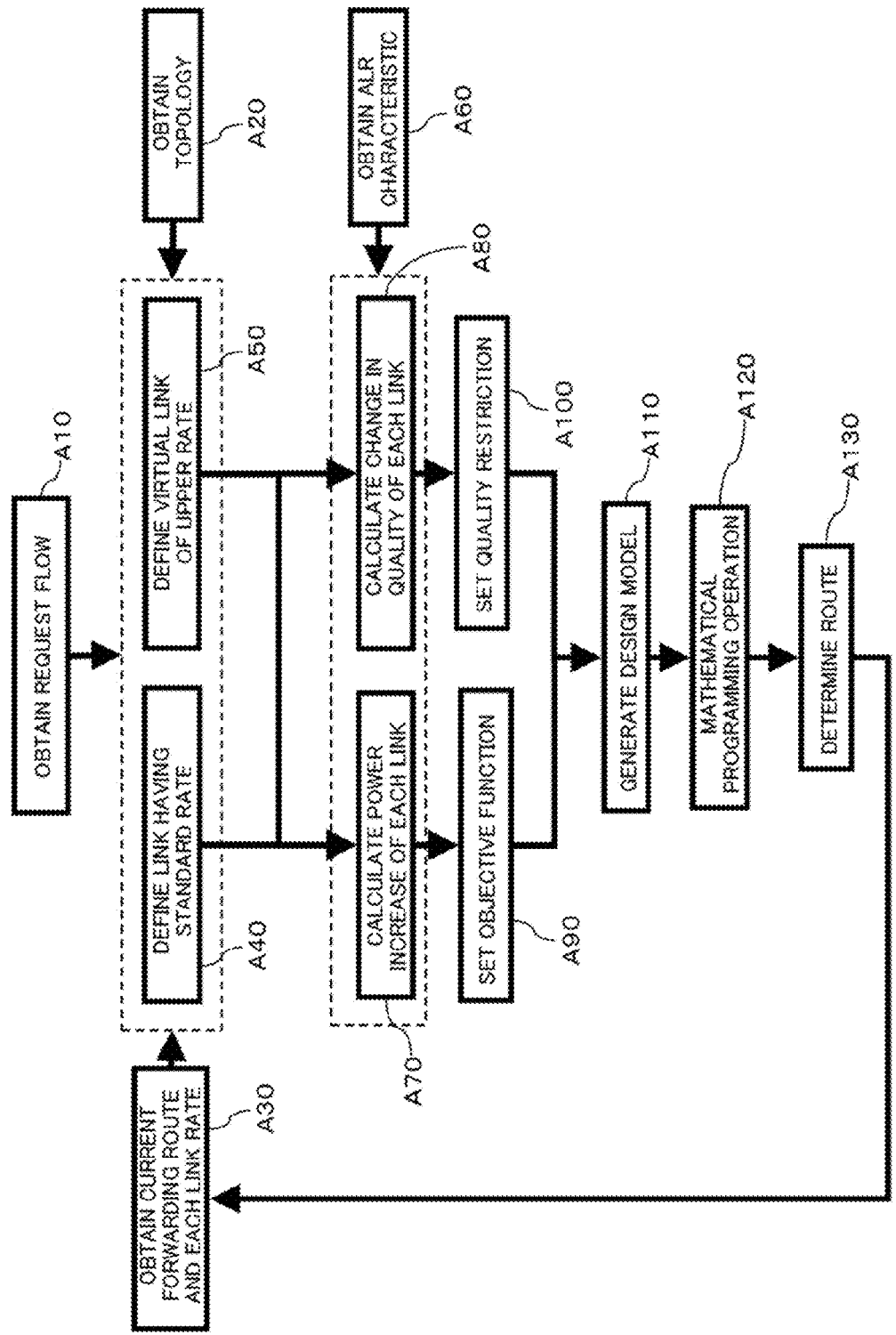
FIG. 15 is a flow diagram illustrating a succession of procedural steps of determining a route in a network management system of the first embodiment.

Description will now show relation to an example of a procedure to determine a route in the network management system 1 with reference to a flow diagram (steps A10 through A130) of FIG. 15.

When the management server 10 receives a request flow r from a source node in the network 2 (step A10), the status measure 105 obtains the topology of the network 2 (step A20), for example. The status measure 105 measures then (i.e., current) amounts of link traffic of the respective data links (i, j) of the network 2. The status measure 105 obtains a current forwarding route and the corresponding link rate of each link (step A30). The status measure 105 stores the obtained data into the link cost calculating data 115.

Based on the information obtained by the status measure 105, the link cost manager 107 sets a link having a present rate for a virtual present link Link1_p (step A40) and also sets a link having an upper rate to be a virtual upper line Link1_u (step S50) for each links. Namely, the link cost manager 107 sets virtual links by adding an upper link to a link having a present rate.

The link cost manager 107 refers to the ALR characteristic (step A60) previously stored in association with each nodes, and thereby obtains a link rate (physical link rate) and a link power consumption.

Then, the link cost manager 107 calculates an amount (i.e., virtual link cost) of power increase of each virtual link when the request flow r is added (step A70). The link cost manager 107 stores the amounts of power increase into the link cost calculating data 115. Based on the amounts of power increase of the respective virtual links and the above formula (5), the link cost manager 107 sets an objective function (an expanded objective function) for each of the virtual links (step A90).

The constraint condition designer 104 calculates amounts of change in quality of respective virtual links (step A80) when the request flow r is added. Namely, the constraint condition designer 104 calculates buffering delay and a loss rate when the request flow r is added, and stores the calculated buffering delay and the calculated loss rate when the request flow r is added into the quality constraint generating data 116.

The constraint condition designer 104 sets the quality constraint (step A100). In other words, the constraint condition designer 104 creates the quality constraint formulae based on the buffering delay and the loss rate when the request flow r is added and the above formulae (8) and (9). The constraint condition designer 104 sets a constraint condition formula conforming to the flow conservation law based on the above formula (6) and sets a constraint condition formula conforming to the hop-length constraint based on the formula (7). Furthermore, the constraint condition designer 104 sets quality constraint condition formulae of an existing path K based on the above formulae (10) through (13). Thereby, a design model is generated based on the objective function and the quality constraint condition formulae (step A110).

The optimum route calculator 102 calculates an optimum design variable (Xij) (step A120) by solving the created design model, being regarded as a 0-1 integer programming problem, through the use of a solver, so that the optimum route X is calculated and specified (step A130).

Then, the route designer 106 incorporates the request flow r into the route in the network 2 determined by the optimum route calculator 102 and passes the request flow r through the determined route. At the same time, the device power controller 109 changes the power-saving operational levels of the respective nodes in the network 2 in conformity with the link rates of the virtual links determined by the optimum route calculator 102 and brings the procedure back to step A30.

In the step 130, the design history manager 103 stores the information about the optimum route determined by the optimum route calculator 102, as the route history data 113, into the RAM 11. Namely, in relation to the respective links specified by the constraint condition designer 104, the link rates capable of carrying the amounts of link traffic after the addition of the request flow r to the respective links specified by the constraint condition designer 104 are used as the standard link rates of the respective links.

The program (network management program) to achieve the above functions as the optimum route calculator 102, the design history manager 103, the constraint condition designer 104, the status measure 105, the route designer 106, the link cost manager 107, the link rate setter 108, and the device power controller 109 may be provided in the form of being stored in a computer-readable recording medium, such as a flexible disk, a CD (e.g., CD-ROM, CD-R, CD-RW), a DVD (e.g., DVD-ROM, DVD-RAM, DVD-R, DVD+R, DVD-RW, DVD+RW, HD DVD), a Blu-ray disk, a magnetic disk, an optical disk, and a magnetic-optic disk. In this case, a computer reads the programs from the recording medium and sends the read programs to an internal or external memory to store for use. Alternatively, the programs may be recorded in a memory device (a recording medium), such as a magnetic disk, an optical disk or a magneto-optical disk, and is provided to the computer from the memory device through a communication path.

In order to achieve the functions as the optimum route calculator 102, the design history manager 103, the constraint condition designer 104, the status measure 105, the route designer 106, the link cost manager 107, the link rate setter 108, and the device power controller 109, a microprocessor (in the illustrated example, the CPU 101) in a computer executes the program stored in an internal memory (in the illustrated example, the RAM 11 or the ROM 12). At that time, the execution may be carried out by the computer reading the program stored in a recording medium.

Here, a computer is a concept of a combination of hardware and an OS and means hardware which operates under control of the OS. Otherwise, if an application program operates hardware independently of an OS, the hardware corresponds to the computer. Hardware includes at least a microprocessor such as a CPU and means to read a computer program recorded in a recording medium. In the first embodiment, the management server 10 serves to function as a computer.

According to the above network management system 1 serving as an example of the first embodiment, when a new request flow r is added to the network 2 including of nodes having an ALR function, link costs corresponding to changes in power to be consumed in the traffic devices are provided, so that a route having a smallest cost can be calculated. Consequently, a route costing the lowest (sum of the) power consumption at the respective nodes can be specified.

Specifically, prospective amounts of link traffic when the respective virtual links carry the request flow r from the current traffic status are calculated, and power increases are estimated from the calculated amounts of link traffic using the ALR characteristic. The estimated increases are regarded as link costs. Then, an objective function to generate a route having a smallest sum of link costs is generated. Consequently, among candidates routes connecting the source and the destination (Src-Des) of a request flow r, the route having a smallest link cost can be obtained, so that an optimum route can be determined.

In addition, an optimum route of a request flow r newly added can be determined which satisfies end-to-end quality requirements of the respective flows including existing flows already set and which has the smallest sum of link costs.

The constraint condition designer 104 formulates the end-to-end loss rates and delay of the request flow and existing flows into linear equations based on the relationship models between "load and delay" and "load and packet loss" of each virtual link of the network 2.

Thereby, the optimum route calculator 102 calculates a route by solving a 0-1 programming problem using a linear objective function and linear constraint formulae that determine a route having the smallest sum of link costs.

Furthermore, a route having the lowest power consumption and concurrently satisfying the quality requirements of the delay and the loss rate can be specified by a combination of an objective function obtained from the link cost value estimated based on the ALR characteristic and constraint conditions to satisfy the end-to-end quality requirements of the flows.

At that time, a virtual present link (Linkα_p) that has a forwarding rate capable of carrying the total amount of traffic when the request flow r passes through the link and a virtual upper link (Linkα_u) that has a upper rate than that of the corresponding virtual present link are set for each link. Then, a route is determined by solving a 0-1 programming problem for each of the virtual links using a linear objective function and linear constraint formulae that determine a route having the smallest sum of link cost.

From the above procedure, it is possible to determine the optimum candidate route that satisfies the quality requirements from the virtual present link capable of carrying the prospective amount of traffic and the virtual upper link having an upper rate than that of the virtual present link.

Figure 16:
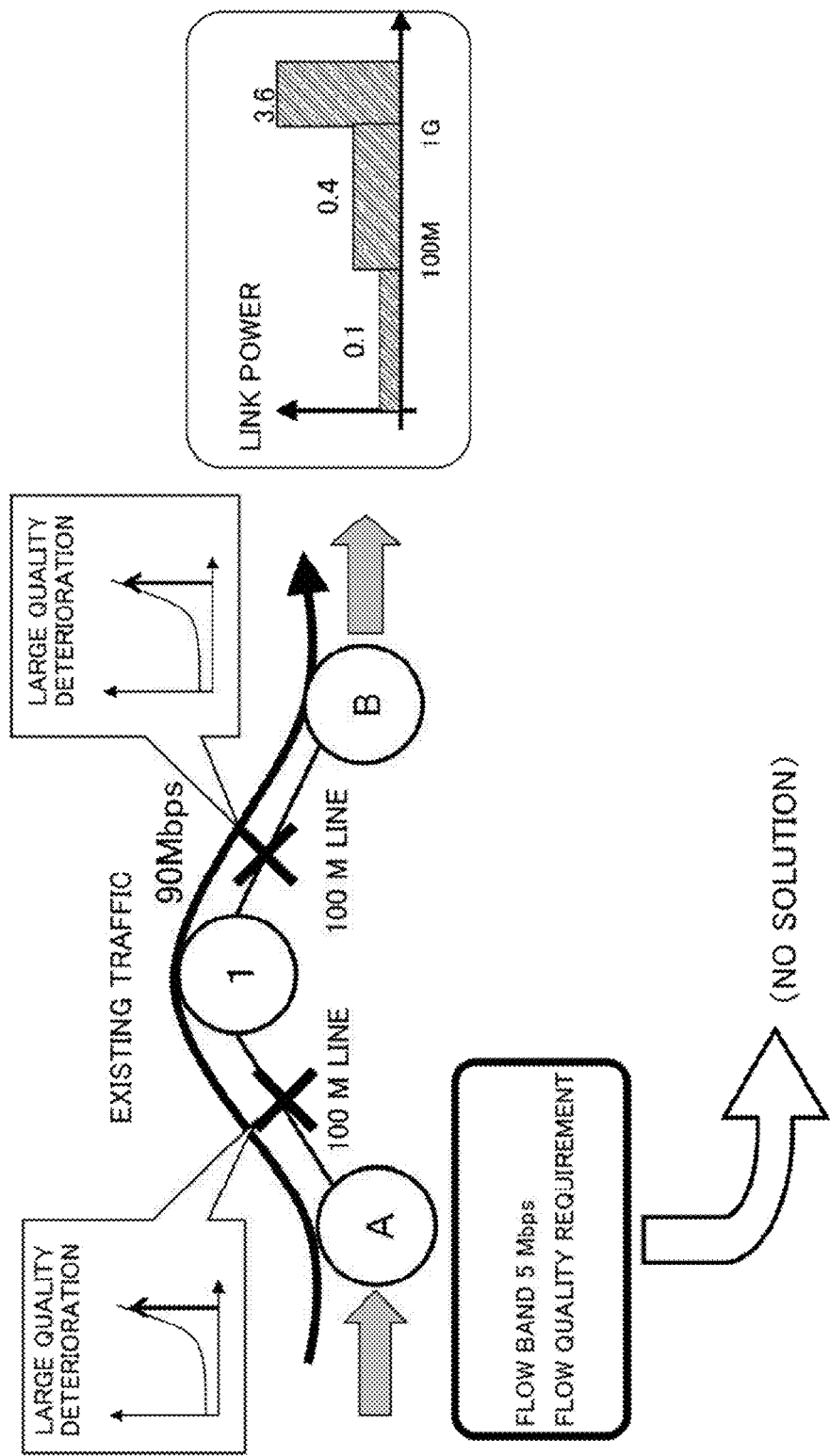
FIG. 16 is a diagram illustrating an effect of a network management system of the first embodiment.
Figure 17:
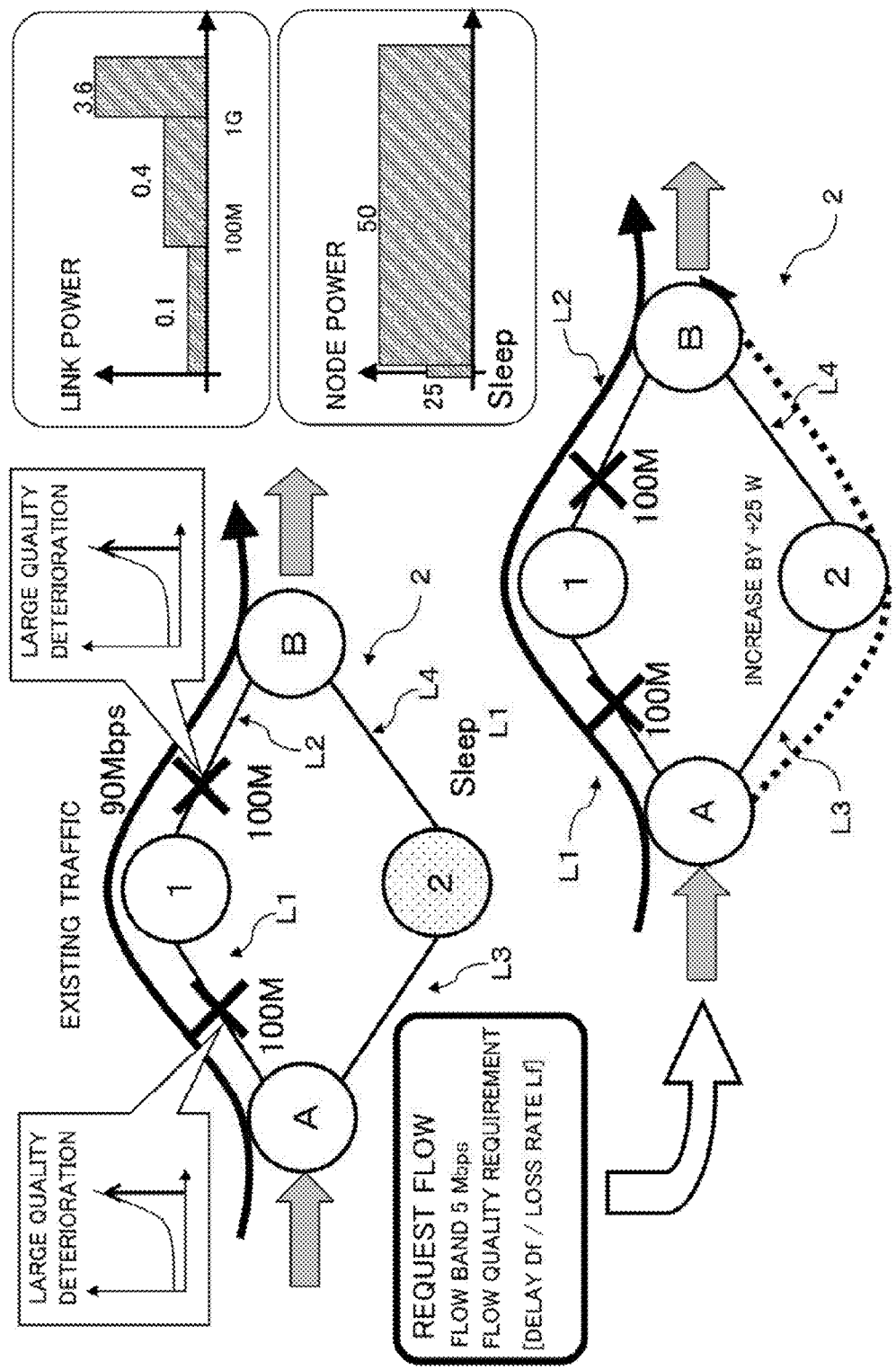
FIG. 17 is a diagram illustrating an effect of a network management system of the first embodiment.

FIGS. 16 and 17 are diagrams illustrating examples of effects of the network management system 1 of the first embodiment.

In the network 2 of FIG. 16, traffic of 90 Mbps is flowing through a route consisting of the link L1 from the node A to the node 1 and the link L2 from the node 1 to the node B. When a new flow of 5 Mbps is to flow through the route, a line of 100 Mbps can handle prospective traffic of 95 Mbps through the links L1 and L2.

However, if the links L1 and L2 have volume of link traffic close to the upper limit of the link rates, which means load close to 100%, delay and loss rate sharply rise. Therefore, passing traffic of 95 Mbps through a line having a link rate of 100 Mbps makes it difficult to satisfy the quality requirements for the end-to-end delay and the loss rate of the request flow r. Consequently, an optimum candidate may not be obtained and the problem may result in "no solution".

In other words, simply specifying a route having a smallest link cost and satisfying the quality requirements may not determine an optimum candidates, so that there is a possibility of judging that the request flow is not be carried.

According to the network management system 1 of the first embodiment, two virtual links of a single logical link are prepared which include a virtual present link serving as a reference to carry prospective traffic and a virtual upper link; candidate routes satisfying quality requirements for the respective virtual links are extracted; and a route having the smallest power (consumption) is selected. In the network 2 of FIG. 16, choosing the virtual upper link of 1 Gbps instead of the virtual present link of 100 Mbps can specify a route that satisfies the quality requirements of the request flow.

In the network 2 of FIG. 17, traffic of 90 Mbps is flowing through a route R1 including the link L1 from the node A to the node 1 and the link L2 from the node 1 to the node B. In FIG. 17, the node 2 is in the sleep state and is consuming 25 W node power. The node 2 consumes 50 W node power in the active state.

When a new 5 Mbps flow is to be added to the route R1, a line of a 100 Mbps link rate can treat 95 Mbps traffic flowing through the links L1 and L2.

If the links L1 and L2 have amount of link traffic close to the upper limit of the link rate, which means load close to 100%, delay and loss rate sharply rise. This makes it difficult to satisfy the end-to-end quality requirements for the delay and the loss rate of the request flow r. Consequently, an optimum candidate may not be obtained and the problem may result in "no solution". In other words, there is a possibility of judging that no route can carry the request flow.

As one solution, it may be possible to select the route R2 that passes, in sequence, the node A, the node 2, and the node B and to activate the node 2 being in the sleep state. However, this solution increases the node power consumption from 25 W to 50 W when the node 2 is activated.

According to the network management system 1 of the first embodiment, two virtual links of a single logical link are prepared which include a virtual present link serving as a reference to carry prospective traffic and a virtual upper link; candidate routes satisfying quality requirements for the respective virtual links are extracted; and a route having the smallest power (consumption) is selected. In the configuration of FIG. 17, selecting the virtual upper link of 1 Gbps instead of the virtual present link of 100 Mbps can generate a route that satisfies the quality requirements of the request flow. In this case, there is no need of activating the node 2 being in the sleep state, so that the node power is prevented from increasing. Consequently, an optimum route can be generated which can satisfy the quality requirements of the request flow and which also consumes less power.

The above example assumes that the respective nodes have the same ALR characteristic, but are not limited to such a case. For example, a source node and a destination node on a link may have different ALR characteristics, or a part of nodes in the network may have different ALR characteristics. The ALR characteristic of each node may be appropriately modified.

(B) Process 1 for Equal Cost:

The above first embodiment determines a route that satisfies the quality requirements for delay and a loss rate and that has the smallest power consumption to be a route candidate of the request flow. The above determination has a possibility of generating a number of routes (candidate routes) having the same smallest sum of the link costs. Hereinafter, a state of the presence of two or more route having the same smallest sum of link costs is called "equal cost".

Figure 18:
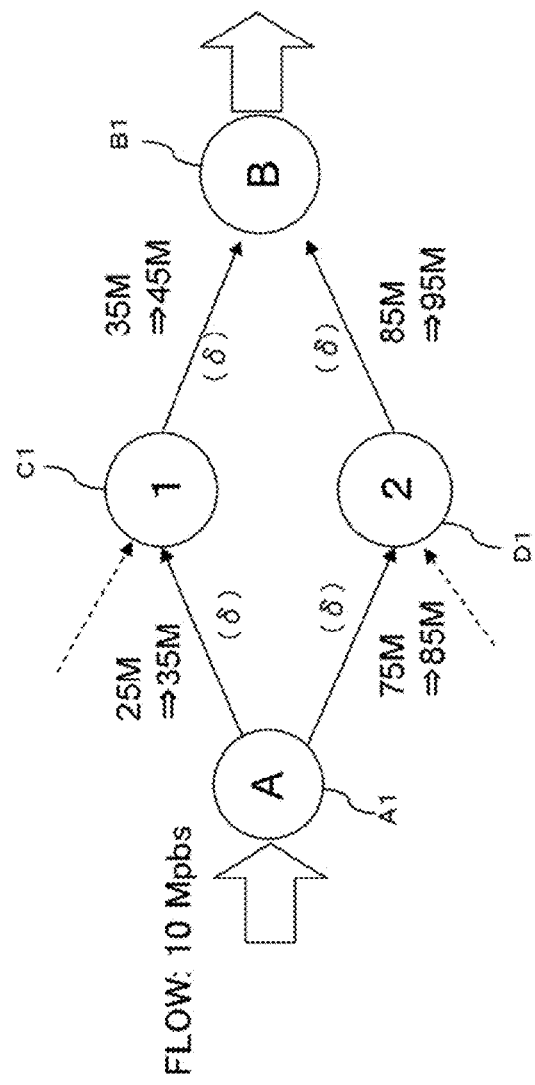
FIG. 18 is a diagram illustrating an example of the configuration of a network.
Figure 19:
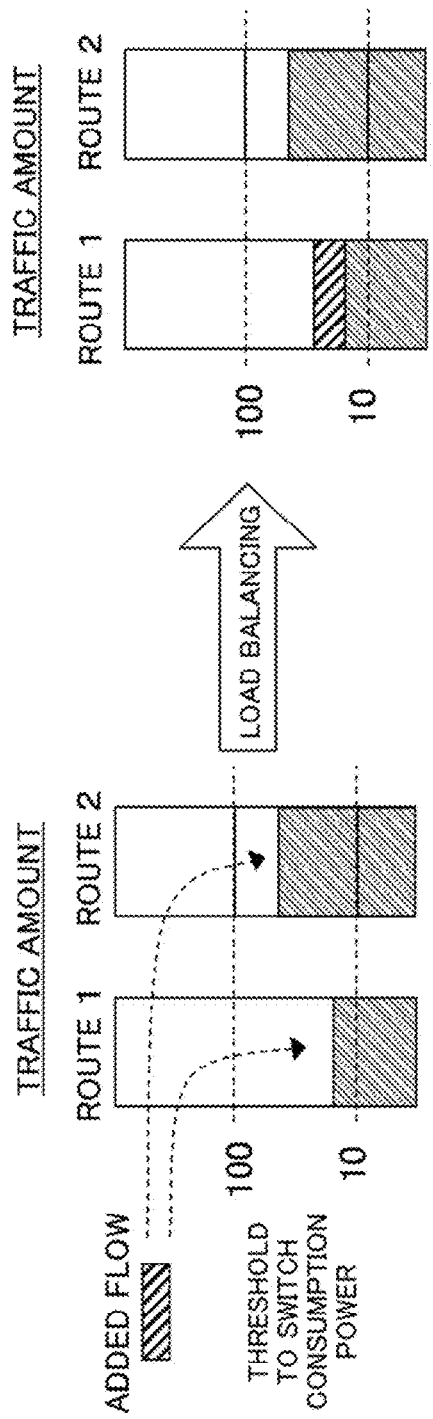
FIGS. 19A and 19B are diagrams illustrating a conventional manner of selecting a route.
Figure 20:
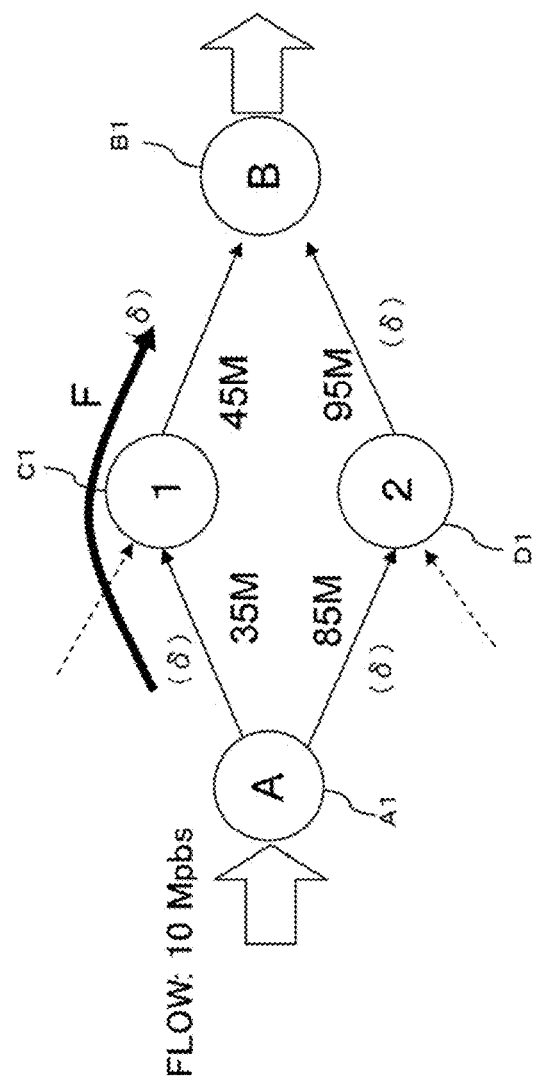
FIG. 20 is a diagram illustrating an example of a selected route.

FIG. 18 is a diagram illustrating an example of the network configuration; FIGS. 19A and 19B are diagrams illustrating a conventional manner of selecting a route; and FIG. 20 is a diagram illustrating an example of a selected route.

The example of FIG. 18 illustrates a network that comes into the equal-cost state when a 10 Mbps request flow (additional flow) is newly added.

In the example of FIG. 18, the link L(A, 1), the link (1, B), the link (A, 2), and the link (2, B) have minute (δ) link costs. Therefore, a route passing through, in sequence, the node A, the node 1, and the node B and a route passing through, in sequence, the node A, the node 2, and the node B are in the equal-cost state.

Under the presence of two or more route being the equal-cost state, a conventional technique selects a route having the lowest load, so that loads of traffic on the respective routes can be balanced. For example, as illustrated in FIG. 20, if the routes 1 and 2 are provided as depicted in FIG. 19A, the route 1 having a lower load, that is, having a smaller amount of traffic, is selected. This selection adds the request flow into the route 1, as depicted in FIG. 19B.

However, in the example of FIG. 19A, the current amount of link traffic on route 1 is slightly higher than a threshold (i.e., 10 Mbps) to switch the link power consumption. For the above, if traffic is reduced by future release of a current flow on route 1, route 1 has a high possibility of shifting to an operational level (i.e., power-saving operational level) of one-level lower power consumption, so that the link power consumption is also reduced.

Specifically, such a conventional technique, which selects a route currently having a lower load for a request flow in the event of occurrence of "equal cost", does not consider the possibility of reducing power consumption through the use of the power-saving function equipped with the respective nodes, and otherwise may make a selection that reduces the possibility of saving the power consumption. For the above, if the network has two or more equal-cost candidate routes, the optimum route is preferably selected from the candidate routes.

Specifically, a route is selected from two or more equal-cost candidate routes, considering the possibility of lowering power consumption following the future reduction in traffic. A "power reducing index" that represents the possibility of lowering power consumption of each of the equal-cost routes is calculated, and the route selection is based on the calculated power reducing indices. Consequently, the request flow can be carried, such that the possibility of lowering power consumption following the traffic reduction can be maintained.

The following example assumes that the source node and the destination node of a link have different ALR characteristics. This means that the source node and the destination node that are connected to each other to form a link have different link power consumption characteristics.

Hereinafter, the source and the destination nodes may have the same ALR characteristic, and another modification can be of course suggested.

Hereinafter, a "link" means a virtual link that the optimum route calculator 102 selected as a candidate route in the above manner.

Figure 21:
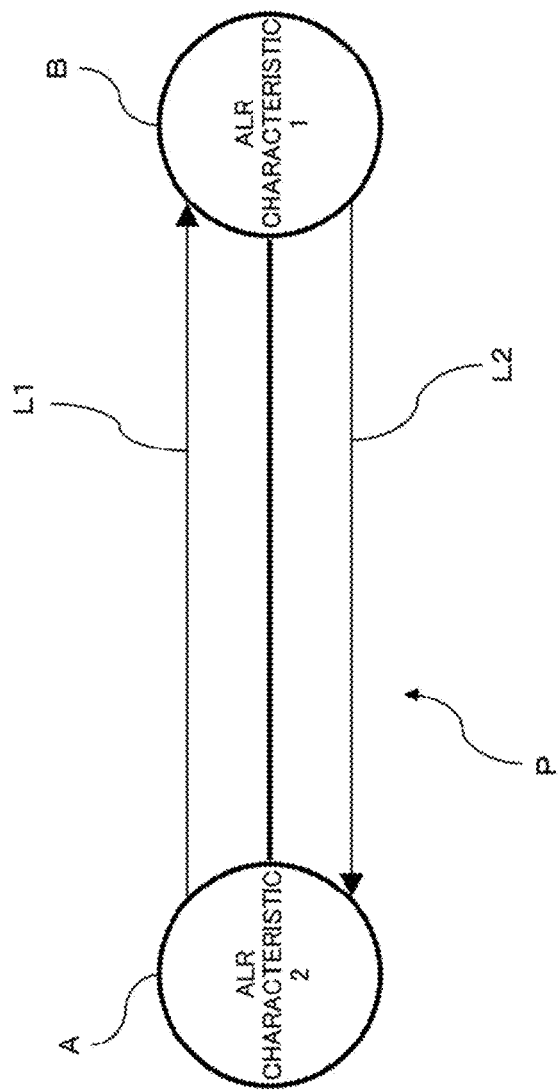
FIG. 21 is a diagram illustrating an example of the configuration of a link.
Figure 22:
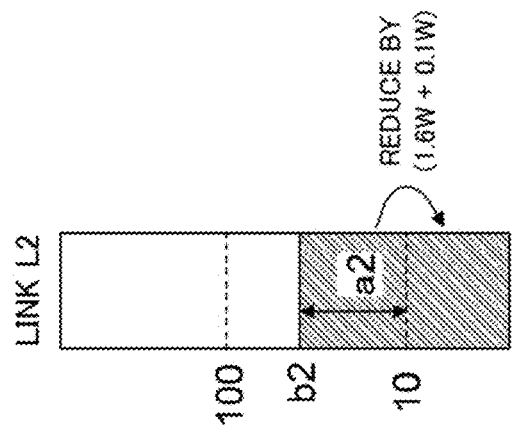
FIGS. 22A and 22B are diagrams illustrating a manner of calculating a power reducing index of each link.
Figure 22:
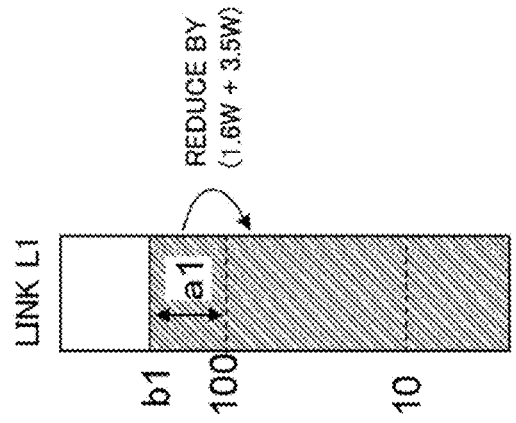
Figure 23:
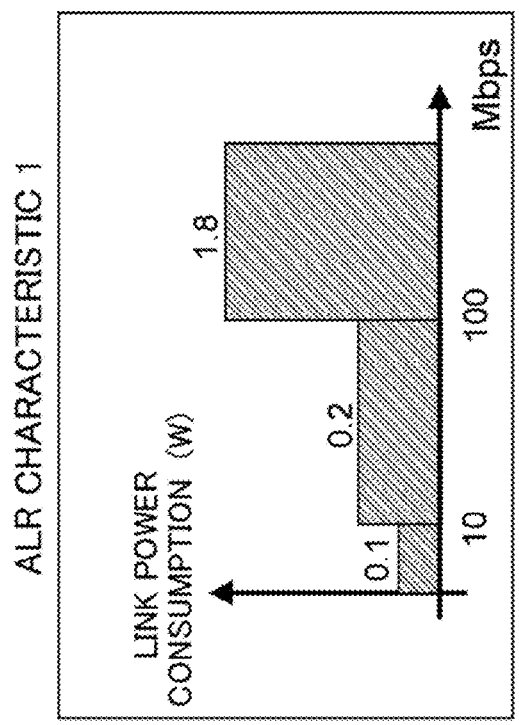
FIG. 23 is a diagram illustrating an ALR characteristic.

FIG. 21 illustrates an example of the configuration of a link; FIGS. 22A and 22B are diagrams illustrating a manner of calculating a power reducing index of each link; FIG. 23 is a diagram denoting an ALR characteristic 1; and FIG. 24 is a diagram denoting an ALR characteristic 2.

As illustrated in FIG. 21, the nodes A and B are connected to each other by a physical link P, which includes opposite links (link L1 and link L2) of the respective opposite directions, and the links L1 and L2 are independently managed.

This example assumes that a network adaptor AD of the node A, which is the source node of the link L1 and also the destination node of the link L2, has an ALR characteristic 2; and a network adaptor AD of the node B, which is the destination node of the link L1 and also the source node of the link L2, has an ALR characteristic 1.

Figure 24:
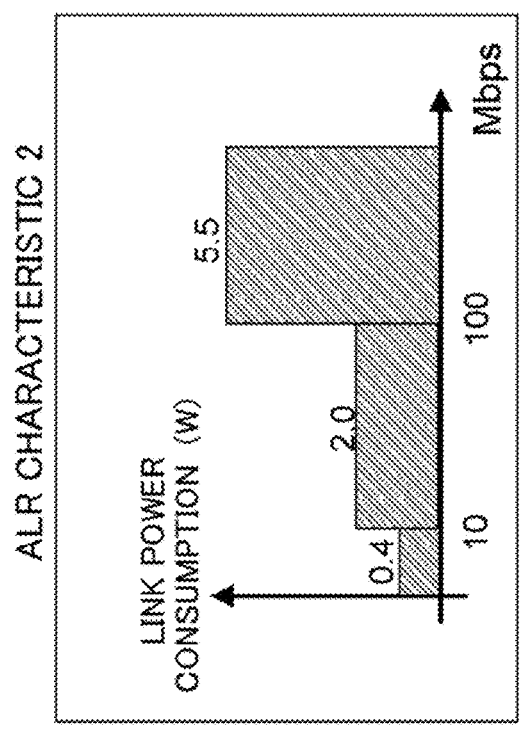
FIG. 24 is a diagram illustrating an ALR characteristic.

The ALR characteristic 1 has a relationship between an amount of link traffic and link power consumption illustrated in FIG. 23; and the ALR characteristic 2 has the relationship between an amount of link traffic and link power consumption illustrated in FIG. 24.

Namely, the link power consumption in the ALR characteristics 1 and 2 takes discrete values, and stepwisely changes with a larger amount of traffic between the opposite links.

As depicted in FIG. 23, the ALR characteristic 1 has link power consumption of 0 W at an amount of link traffic of 0 Mbps; 0.1 W at a link traffic volume of 0-10 Mbps; 0.2 W at a link traffic volume of 10-100 Mbps; and 1.8 W at a link traffic volume exceeding 100 Mbps.

As depicted in FIG. 24, the ALR characteristic 2 has link power consumption of 0 W at an amount of link traffic of 0 Mbps; 0.4 W at a link traffic volume of 0-10 Mbps; 2.0 W at a link traffic volume of 10-100 Mbps; and 5.5 W at a link traffic volume exceeding 100 Mbps.

Namely, the ALR characteristics 1 and 2 have rate thresholds of 10 Mbps and 100 Mbps to stepwisely change the power consumption operational level.

Here, the interval between two rate thresholds of the ALR characteristics may be sometimes called a traffic level. For example, the ALR characteristic 1 of FIG. 23 has three traffic levels of a link traffic volume of 0-10 Mbps, 10-100 Mbps, and exceeding 100 Mbps.

A link traffic volume of 0-10 Mbps is regarded as the same traffic level and corresponds to a power consumption level of 0.1 W. Similarly, a link traffic volume of 10-100 Mbps is regarded as the same traffic level and corresponds to a power consumption level of 0.2 W; and a link traffic volume exceeding 100 Mbps is regarded as the same traffic level and corresponds to a power consumption level of 1.8 W.

In the example of FIG. 23, degrading the traffic level by one degrades the power consumption operational level to reduce power consumption by one level.

Here, a power reducing index is obtained by averaging and indexing of power reducing effect per 1 bps reduction in link traffic volume.

Specifically, a power consumption reducing index S is calculated from the following formula (14).

$$S=(Ed+Es)/a \qquad (14)$$

In formula (14), the term Ed represents an amount of reduced power consumption at the destination node; the term Es represents an amount of reduced power consumption at the source node; and the term a represents the difference between the current amount of traffic and the rate threshold that allows the power consumption to decrease by one level.

The difference, between the current volume of traffic and the rate threshold that allows the power consumption to decrease by one level, is a difference of the ALR characteristic between a current traffic volume and a traffic volume (rate threshold) serving as a boundary to switch the power consumption associated with the current traffic volume to the one-level lower power consumption operational level.

A rate threshold that allows the power consumption to decrease by one level is a rate threshold that is lower than the current traffic volume and is also the closest to the current traffic volume. In other words, a rate threshold that allows the power consumption to decrease by one level is a rate threshold with respect to a one-level lower traffic level.

A reference number "a1", obtained by attaching the reference number "1" representing the link L1 to the reference symbol "a" representing the difference between the current amount of traffic and the rate threshold that allows the power consumption to decrease by one level, represents the difference of the link L1 between the current amount of traffic and the rate threshold that allows the power consumption to decrease by one level.

Similarly, the reference number "a2" by attaching the reference number "2" representing the link L2 to the reference symbol "a" represents the difference of the link L2 between the current amount of traffic and the rate threshold that allows the power consumption to decrease by one level.

An amount Ed of reduced power consumption at the destination node represents the difference between the link power consumption associated with the current traffic volume at the destination node and the link power consumption associated with one-level lower power consumption (power consumption operational level) when the traffic volume is to be reduced below a rate threshold.

An amount Es of reduced power consumption at the source node represents the difference between the link power consumption associated with the current traffic volume at the source node and the link power consumption associated with one-level lower power consumption (power consumption operational level) when the traffic volume is to be reduced below a rate threshold.

Here, description will now be made in relation to calculation of a power reducing index of the link L1 with reference to FIGS. 21 and 22A.

Assuming that a current traffic volume b1 of the link L1 is larger than 100 Mbps (b1>100 Mbps), a rate threshold that allows the corresponding power consumption to decrease by one level is 100 Mbps.

Namely, the difference a1 between the current traffic volume and a rate threshold that decreases the power consumption by one level is (b1−100) Mbps.

The amount Ed of reduced power consumption at the destination node B (having the ALR characteristic 1) of the link L1 is the difference (1.8 W−0.2 W=1.6 W) between the link consumption amount (1.8 W) associated with the current traffic volume b1 of the link L1 and a link power consumption (0.2 W) when the traffic volume reduces by one level to be below a rate threshold (100 Mbps).

The amount Ed of reducing power consumption means that reducing traffic of the link L1 by a1 (=b1-100 Mbps) has a possibility of reducing the power consumption at the destination node B from 1.8 W to 0.2 W, that is, by 1.6 W.

The amount Es of reducing the power consumption at the source node A (having the ALR characteristic 2) of the link L1 is the difference (5.5 W−2.0 W=3.5 W) between a link consumption amount (5.5 W) associated with the current traffic volume b1 of the link L1 and the link consumption amount (2.0 W) when the link traffic volume declines below a rate threshold (100 Mbps) to reduce the link power consumption by one level.

This means that there is possibility of reducing, when the amount of link traffic of the link L1 is reduced by a1 (=b1−100 Mbps), the power consumption at the source node A from 5.5 W to 2.0 W, that is, by 3.5 W.

For the above, the power consumption reducing index S of the link L1 is calculated by the above formula (1) as follows.

$$\text{the power consumption reducing index } S \text{ of the link } L1 = $$
$$(1.6 \text{ W} + 3.5 \text{ W})/a1 = 5.1 \text{ W}/a1$$

This power consumption reducing index S=5.1 W/a1 of the link L1 means that there is a possibility of reducing 5.1 W at both the source and the destination nodes in total when the amount of traffic is reduced by a1 bps in the link L1.

Next, description will now be made in relation to calculation of a power reducing index of the link L2 with reference to FIGS. 21 and 22(B).

For example, if the current traffic volume b2 of the link L2 is larger than 10 Mbps and is 100 Mbps or less (10 Mbps<b2≤100 Mbps), the rate threshold that allows the power consumption associated with the current traffic volume to reduce by one level is 10 Mbps.

The difference a2 between the current traffic volume and the rate threshold that can reduce the power consumption by one level is (b2−10) Mbps.

The amount Ed (1.6 W) of reducing the power consumption at the destination node A (having the ALR characteristic 2) of the link L2 is the difference (2.0 W−0.4 W=1.6 W) between a link power consumption (2.0 W) associated with the current traffic volume b2 of the link L2 and the link power consumption (0.4 W) when the link traffic volume declines below a rate threshold (10 Mbps) to reduce the link power consumption by one level.

This means that there is possibility of reducing, when the amount of link traffic of the link L2 is reduced by a2 (=b2−10 Mbps), the power consumption at the destination node A from 2.0 W to 0.4 W, that is, by 1.6 W.

The amount Es (0.1 W) of reducing the power consumption at the source node B (having the ALR characteristic 1) of the link L2 is the difference (0.2 W−0.1 W=0.1 W) between a link consumption amount (0.2 W) associated with the current traffic volume b2 of the link L2 and the link consumption amount (0.1 W) when the link traffic volume declines below a rate threshold (10 Mbps) to reduce the link power consumption by one level.

This means that there is possibility of reducing, when the amount of link traffic of the link L2 is reduced by a2 (=b2−10 Mbps), the power consumption at the source node B from 0.2 W to 0.1 W, that is, by 0.1 W.

For the above, the power consumption reducing index S of the link L2 is calculated by the above formula (14) as follows.

$$\text{the power consumption reducing index } S \text{ of the link } L2 = $$
$$(1.6 \text{ W} + 0.1 \text{ W})/a2 = 1.7 \text{ W}/a2$$

This power consumption reducing index S=1.7 W/a2 of the link L2 means that there is a possibility of reducing 1.7 W at both the source and the destination nodes in total when the amount of traffic is reduced by a2 bps in the link L2.

After calculating the power reducing index for each link in the above manner, the optimum route calculator 102 calculates the sum of power reducing indices of the constitutional links of each of the equal-cost routes (candidate routes) and selects one candidate route having the smallest sum of the power reducing indices of the constitutional links as a route of the request flow.

Figure 25:
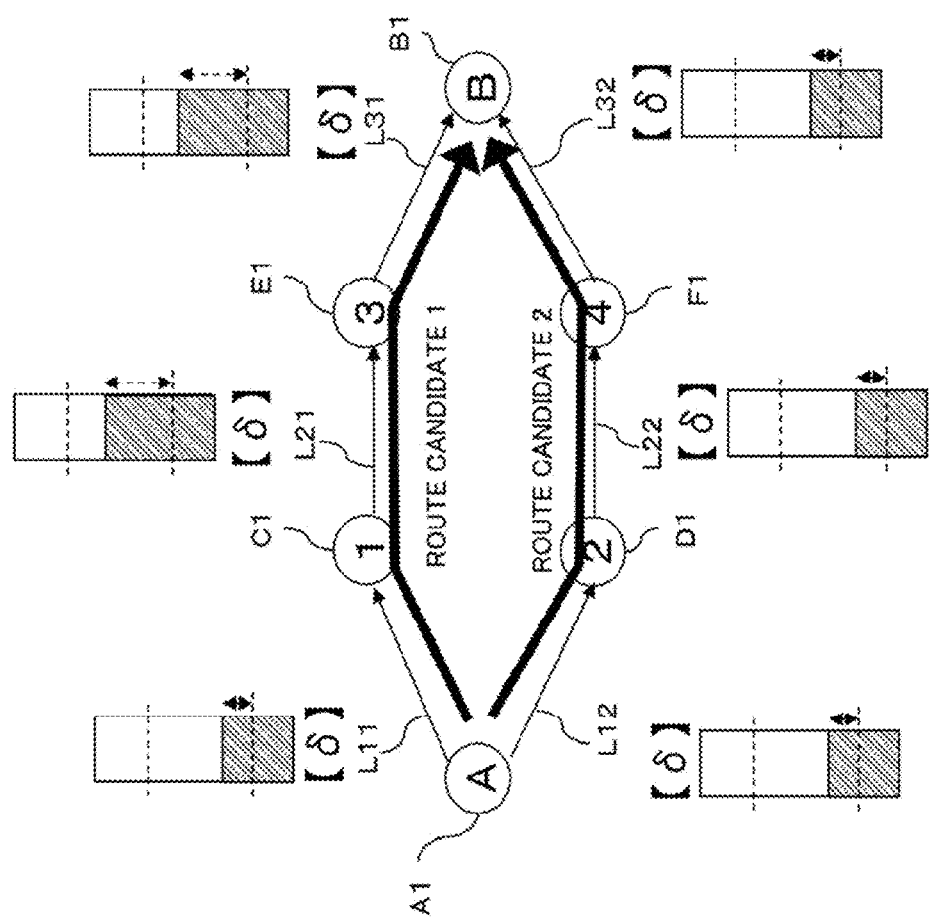
FIG. 25 is a diagram illustrating a manner of selecting a route in the event of equal cost.

FIG. 25 is a diagram illustrating a manner of selecting a route under the equal-cost state. The example of FIG. 25 depicts two candidate routes 1 and 2 being in the equal-cost state for a route from the origin node A1 to the terminal node B1.

The candidate route 1 passes through, in sequence, the node A1, the node C1, the node E1, the node B1 and has the links L11, L21, and L31. The candidate route 2 passes through, in sequence, the node A1, the node D1, the node F1, the node B1 and has the links L12, L22, and L32.

In the example of FIG. 25, all the links L11, L12, L21, L22, L31, and L33 have link costs of minute values δ, so that the route candidate 1 and the route candidate 2 are in the state of equal cost.

The optimum route calculator 102 calculates the power reducing indices of the candidate routes 1 and 2 as follows.

Power reducing index of candidate route 1=power reducing index of link L11+power reducing index of link L21+power reducing index of link L31

Power reducing index of candidate route 2=power reducing index of link L12+power reducing index of link L22+power reducing index of link L32

Namely, the power reducing index of a candidate route is calculated by totaling the respective power reducing indices of the constitutional links of the candidate route.

Then, based on the calculated power reducing indices of the candidate routes 1 and 2 being in the equal-cost state, the optimum route calculator 102 selects (determines) a candidate route having the smallest sum of the power reducing indices of the constitutional links as the route of the request flow.

FIG. 26 is a flow diagram denoting an example of a succession of procedural steps of calculating the route by the optimum route calculator 102 of the network management system 1.

The optimum route calculator 102 sets virtual links for all the links on all the routes from the origin node (source node) to the terminal node (destination node) of a flow setting request, and determines a route having a lowest power consumption and also satisfying the quality requirements for the delay and loss rate requirements to be a route candidate for the request flow (step S51)

The optimum route calculator 102 confirms the presence of two or more equal-cost routes (step S52). If equal-cost routes are not present (NO route in step S52), the optimum route calculator 102 determines the route having the smallest sum of the link costs to be the route of the request flow (step S56) and terminates the procedure.

If equal-cost routes are present (YES route in step S52), the optimum route calculator 102 calculates the power reducing indices of all the links constructing each equal-cost route (candidate routes) (step S53). Then the optimum route calculator 102 calculates the sum of the power reducing indices of the links constructing each candidate routes (step S54), selects a candidate route having the smallest sum of the power reducing indices as the route of the request flow (step S55) and terminates the procedure.

According to the above procedure, even if two or more equal-cost routes are generated, it is possible to select a route capable of more contributing to power saving because the selection considers the power reducing tendency. In other words, a forwarding route of the request flow can be determined such that the possibility of reducing power consumption is enhanced as for future decrease in traffic volume. Thereby, increase in power consumption in the entire network can be inhibited, so that the network can be efficiently operated from the power-saving aspect.

(C) Process 2 for Equal Cost:

In the above (B) process 1 for equal cost, a power reducing index is calculated for each link. In an actual system operation, fluctuation in amounts of traffic in opposite directions affects link rates and power consumption, but another factor may be suggested.

Alternatively, a power reducing index may be calculated using link traffic volume in opposite directions of the same physical link.

In this Process 2, description is made in relation to the same example as that of the above (B) process 1 specifically in which the nodes A and B are connected to each other by a physical link P, which is managed in the separated forms of links (link L1 and link L2) in the opposite directions (see FIG. 21).

This process also assumes that the nodes on the both ends of the physical link P have different ALR characteristics. Specifically, as illustrated in FIG. 21, the node A on one end of the physical link P has the ALR characteristic 2 while the node B on the other end of the physical link P has the ALR characteristic 1.

Also in this process, the ALR characteristic 1 has the relationship between an amount of link traffic and the link power consumption as depicted in FIG. 23 and the ALR characteristic 2 has the relationship between an amount of link traffic and the link power consumption as depicted in FIG. 24.

As illustrated in FIGS. 23 and 24, the ALR characteristics 1 and 2 have the same rate thresholds (10 Mbps, and 100 Mbps).

(a) Process when Amounts of Link Traffic Of Opposite Links are on the Same Traffic Level:

Here, description will now be made in relation to a case where an amount of link traffic of the link L1 is on the same level of that of the link L2. Likewise the above case, when links opposite in direction but same in physical link (hereinafter, simply called opposite links) have link traffic volume on the same traffic level, reduction in the power consumption of the corresponding physical link needs to reduce the traffic levels of the both links L1 and L2. This means that the power consumption operational levels of the both links L1 and L2 are to be decreased.

In this process, if the opposite links have link traffic volume on the same traffic level, the power consumption reducing index S of the physical link P is calculated by the following formula (15).

$$S=(E1+E2)/(a1+a2) \qquad (15)$$

In formula (15), the term "E1" represents an amount of reduced power consumption at the node on one end; the term "E2" represents an amount of reduced power consumption at the node on the other end; the term "a1" represents a difference between the current traffic volume and a rate threshold capable of reducing the power consumption by one level in the link L1; and the term "a2" represents a difference between the current traffic volume and a rate threshold capable of reducing the power consumption by one level in the link L2.

Figure 27A:
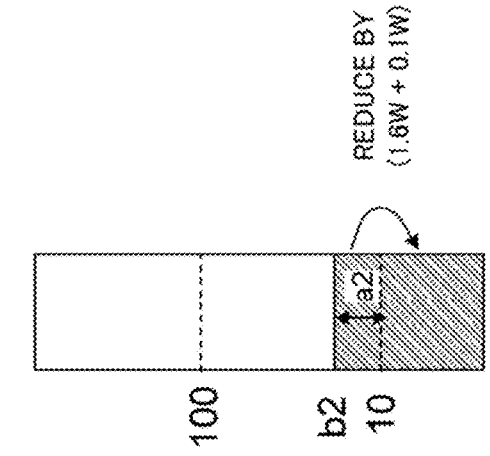
FIGS. 27A and 27B are diagrams denoting a manner of calculating a power reducing index for each link when the opposite links are on the same traffic level.
Figure 27B:
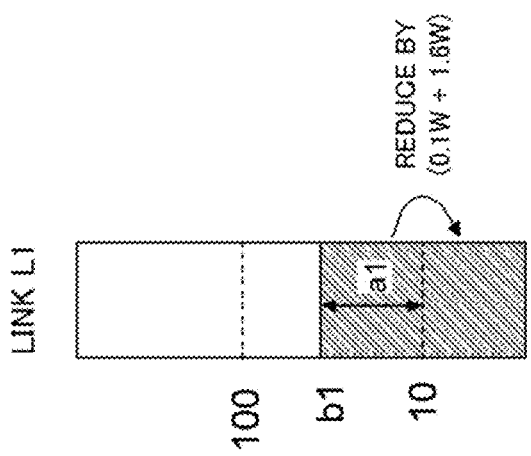
Figure 30A:
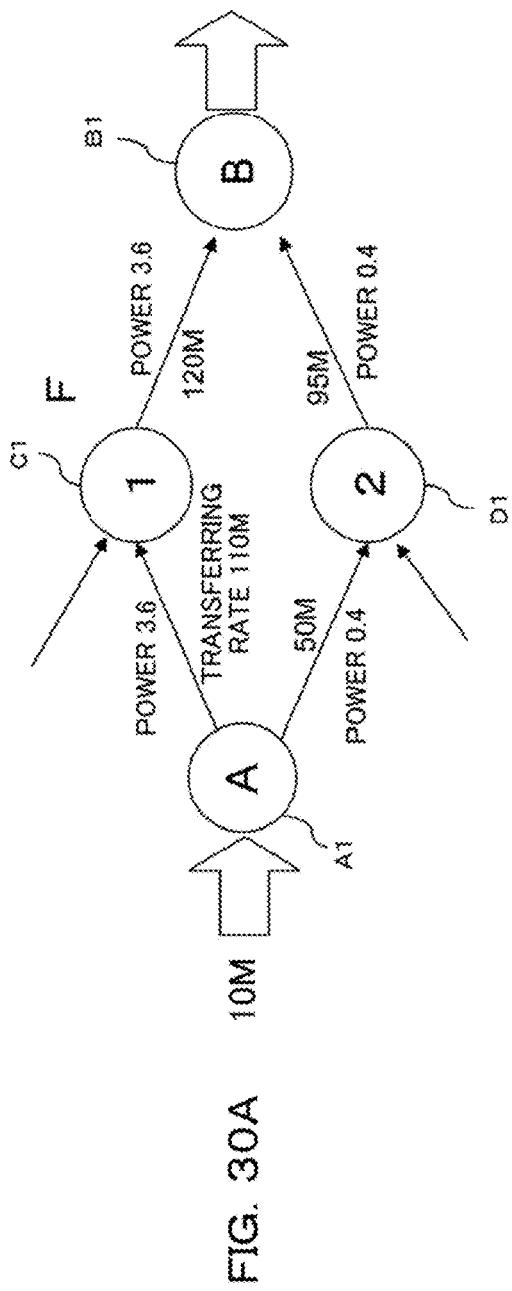
FIGS. 30A and 30B are diagrams illustrating a conventional manner of determining a route.
Figure 30B:
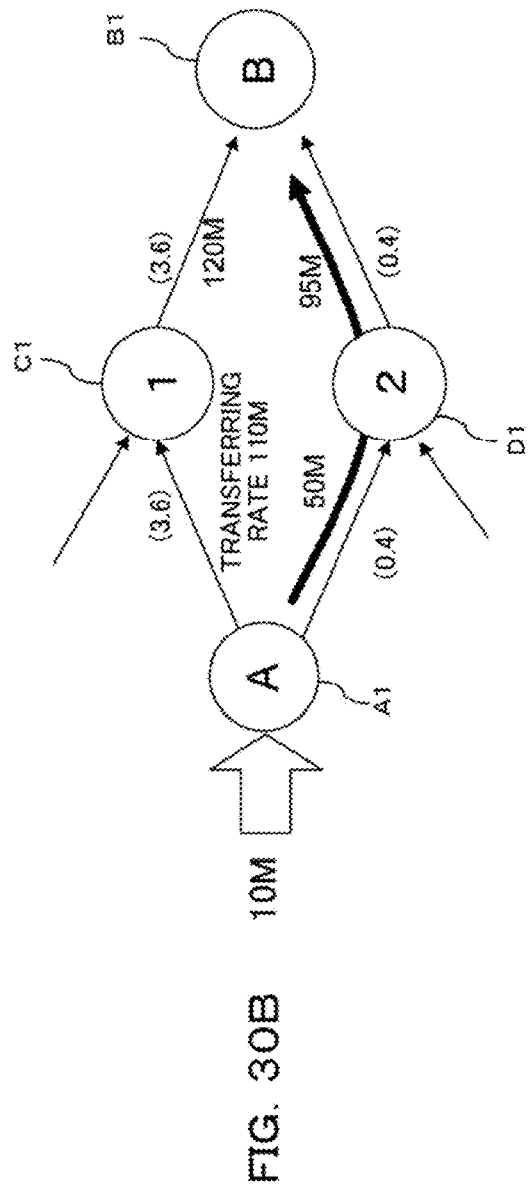

Here, a manner of calculating power reducing indices of the links L1 and L2 using an example of FIGS. 21, 27A, and 27B. FIGS. 27A and 27B denote a manner of calculating power reducing index of each of the opposite links on the same traffic level.

This example assumes that the current amount b1 of link traffic of the link L1 and the current amount b2 of link traffic of the link L2 are both larger than 10 Mbps and are also 100 Mbps or less (i.e., 10 Mbps<b1≤100 Mbps, and 100 Mbps≥b2>10 Mbps). For either link, the rate threshold which is capable of reducing the current traffic volume and the power consumption by one level is 10 Mbps.

The power consumption reducing index S of the physical link P is obtained by averaging and indexing of power reducing effect per 1 bps reduction in link traffic volume. In this calculating manner, it is important to grasp the amount of reducing the traffic of the entire physical link P to reduce the power consumption. For the above, this calculation uses the sum of an amount a1 of reducing traffic needed for reducing the traffic level of the link L1 by one level and an amount a2 of reducing traffic needed for reducing the traffic level of the link L2 by one level as the denominator.

The amount Ed (Ed=0.1 W) of reduced power consumption at the destination node B (having the ALR characteristic 1) of the link L1 is the difference (0.2 W−0.1 W=0.1 W) between the link consumption amount (0.2 W) associated with the current traffic volume b1 on the node B and a link power consumption (0.1 W) when the traffic volume on the node B reduces by one level to be below a rate threshold (10 Mbps).

Similarly, the amount Es (Es=1.6 W) of reduced power consumption at the source node A (having the ALR characteristic 2) of the link L1 is the difference (2.0 W−0.4 W=1.6 W) between the link consumption amount (2.0 W) associated with the current traffic volume b1 on the node A and a link power consumption (0.4 W) when the traffic volume on the node A reduces by one level to be below a rate threshold (10 Mbps).

In detail, when the amount of traffic of the link L1 is reduced by a1 bps, the rate threshold comes below 10 Mbps, so that the power consumption of the destination node B is reduced from 2.0 W to 0.4 W, i.e., by 1.6 W. Similarly, the power consumption of the source node A is reduced from 0.2 W to 0.1 W, i.e., by 0.1 W. Thereby, there is a possibility of reducing the power consumption by 1.7 W in total.

The amount Ed (Ed=1.6 W) of reduced power consumption at the destination node A (having the ALR characteristic 2) of the link L2 is the difference (2.0 W−0.4 W=1.6 W) between the link consumption amount (2.0 W) associated with the current traffic volume b2 on the node A and a link power consumption (0.4 W) when the traffic volume on the node A reduces by one level to be below a rate threshold (10 Mbps).

Similarly, the amount Es (Es=0.1 W) of reduced power consumption at the source node B (having the ALR characteristic 1) of the link L2 is the difference (0.2 W−0.1 W=0.1 W) between the link consumption amount (0.2 W) associated with the current traffic volume b2 on the node B and a link power consumption (0.1 W) when the traffic volume on the node B reduces by one level to be below a rate threshold (10 Mbps).

Unless the traffic volume of the link L2 is reduced by b2 bps, the traffic volume of the physical link P does not come below a rate threshold of 10 Mbps. For this reason, in order to reduce the power consumption of the physical link P by 1.7 W (i.e., 0.1 W+1.6 W), the amount of traffic of the link L2 needs to be reduced by a2 bps.

Accordingly, it is understood that, if an amount of link traffic of the corresponding physical link P by (a1+a2) bps, there is a possibility of reducing the power of the physical link P by 1.7 W. The then power reducing index S of the combination of the links L1 and L2 (i.e., the physical link P) is calculated by the above formula (15) as follows.

Power reducing index $S$ of the physical link $P =$ $$(0.1\ W + 1.6\ W)/(a1 + a2) = 1.7\ W/(a1 + a2)$$

The power consumption reducing index S=1.7 W/(a1+a2) of the physical link P means that reducing traffic volume of the links L1 and L2 by a1 bps and a2 bps, respectively, has a possibility of reducing the power consumption on the nodes on the both ends of the physical link by 1.7 W in total.

After calculating the power reducing index for each link in the above manner, the optimum route calculator 102 calculates the sum of power reducing indices of the constitutional links of each of the equal-cost routes (candidate routes) and selects one candidate route having the smallest sum of the power reducing indices of the links constructing a route of the request flow.

(b) Process when Amounts of Link Traffic of Opposite Links are on Different Traffic Levels:

Next, description will now be made in relation to a case where an amount of link traffic of the link L1 is different from that of the link L2.

When opposite links are on different traffic levels, power consumption of the corresponding physical link P is satisfactorily reduced by reducing the traffic level of a link having a higher power consumption operational level (traffic level) between the links L1 and L2.

In other words, between the opposite links L1 and L2 of the physical link P, the power consumption reducing index S of one of the links having a higher traffic level is used as the power consumption reducing index of the physical link P. Accordingly, it is sufficient that the power consumption reducing index S of a link having a higher traffic level is calculated between the opposite-direction links L1 and L2 of the physical link P. The calculation of the power consumption reducing index S can use the above formula (14).

FIGS. 28A and 28B denote a manner of calculating power reducing index of each of the opposite links on different traffic levels.

As illustrated in FIGS. 28A and 28B, the example to be described assumes that the current amount b1 of the traffic of the link L1 is more than 10 Mbps and also is 100 Mbps or less (10 Mbps<b1≤100 Mbps), and the current amount b2 of traffic of the link L2 is less than 10 Mbps (b2<10 Mbps).

In this example, it is sufficient that the power consumption reducing index S of the link L1 having a higher power consumption operational level (traffic level) is calculated.

Specifically, since the current amount b1 of traffic of the link L1 is more than 10 Mbps and also 100 Mbps or less (10 Mbps<b1≤100 Mbps), a rate threshold capable of reducing the power consumption corresponding to the current traffic volume by one level is 10 Mbps.

Consequently, the difference a1 between the current traffic volume and a rate threshold capable of reducing the power consumption by one level is (b1−10) Mbps.

The amount Ed of reduced power consumption at the destination node B (having the ALR characteristic 1) of the link L1 is the difference (0.2 W−0.1 W=0.1 W) between the link consumption amount (0.2 W) associated with the current traffic volume b1 of the link L1 and a link power consumption (0.1 W) when the traffic volume on the node B reduces by one level to be below a rate threshold (10 Mbps).

Next, the amount Es of reduced power consumption at the source node A (having the ALR characteristic 2) of the link L1 is the difference (2.0 W−0.4 W=1.6 W) between the link consumption amount (2.0 W) associated with the current traffic volume b1 of the link L1 and a link power consumption (0.4 W) when the traffic volume on the node A reduces by one level to be below a rate threshold (10 Mbps).

Accordingly, the power consumption reducing index S of the link L1 is calculated by the above formula (14) as follows.

Power consumption reducing index $S$ of the link $L1 =$ $$(0.1\ W + 1.6\ W)/a1 = 1.7\ W/a1$$

This means that the power consumption reducing index S of the physical link P (links L1 and L2) is 1.7 W/a1.

After calculating the power reducing index for each link in the above manner, the optimum route calculator 102 calculates the sum of power reducing indices of the links constructing each of the equal-cost routes (candidate routes) and selects one candidate route having the smallest sum of the power reducing indices of the links constructing a route of the request flow.

As the above, this manner can ensure the same effect as that of (B) process 1 for equal cost and determine a route of the request flow suitable for actual operation of the system by considering the amounts of link traffic of the opposite links of the physical links P.

The above disclosure enables those ordinarily skilled in the art to carry out and produce the foregoing first embodiment.

The technique disclosed herein ensures at least one of the following advantages of:

(1) obtaining a route of a flow that satisfies end-to-end requirements of the flow and other existing flows; and (2) preventing the power consumption of the entire network from increasing when the request flow is added.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An apparatus for determining, for a network including a number of nodes connected via links, a route through which a request flow between two of the nodes passes, each of the links having a characteristic of fluctuating link power consumption depending on an amount of link traffic, the apparatus comprising:
    a processor;
    the processor processing:
    collecting a current amount of link traffic and current link power consumption of each of the links included in the network;
    setting, for each of the links, virtual links including a first virtual link that is capable of carrying a prospective amount of link traffic when the request flow is added and a second virtual link having a power consumption characteristic different from that of the first virtual link;
    estimating an increase in the link power consumption of each of the virtual links when the request flow is added based on the current amount of link traffic, the current link power consumption, the request flow, and the power consumption characteristic, and calculates a link cost of each of the virtual links based on the estimated increase in the link power consumption;
    creating a constraint condition having requirements of satisfying a requirement of end-to-end quality of the request flow based on change in quality of each of the virtual links, the change being caused by allocating the request flow to the virtual link, and
    satisfying a requirement of end-to-end quality of an existing flow based on the change in quality of the existing flow on the virtual link, the change being caused by allocating the request flow to the virtual link;
    calculating, when two or more candidate routes having a smallest sum of the link costs satisfying the constraint condition exist, a power reducing index representing a possibility of reduction in power consumption due to reduction in traffic of each of the candidate routes having the smallest sum of the link costs; and
    determining a route having a smallest power reducing index among a plurality of routes, including a plurality of the virtual links satisfying the created constraint condition, to be the route of the request flow.

2. The apparatus according to claim 1, the processor further processing:
    setting the second virtual link which has higher forwarding capability achieved by a power consumption characteristic higher than that of the first virtual link.

3. The apparatus according to claim 1, the processor further processing:
    estimating quality of the request flow and quality influence on the existing flow based on traffic influence of the request flow on each of the virtual links, and sets linear constraint equations related to the end-to-end quality of the request flow and the existing flow to be the constraint condition; and
    determining a route having a smallest sum of the link costs among a plurality of routes, including a plurality of the virtual links satisfying the created constraint condition, to be the route of the request flow.

4. The apparatus according to claim 1, the processor further processing:
    estimating quality of the request flow and quality influence on the existing flow by applying influence of the request flow on traffic of the virtual link to a quality change forecasting function.

5. The apparatus according to claim 1, the processor further comprising:
    creating the constraint condition based on quality of the request flow and quality influence on the existing flow each time the route of the request flow is determined.

6. The apparatus according to claim 1, wherein the quality requirement comprises an end-to-end delay time.

7. The apparatus according to claim 1, wherein the quality requirement comprises an end-to-end data loss rate.

8. The apparatus according to claim 1, the processor further processing:
    calculating the power reducing index for each of the links included in each of the candidate routes; and
    determining a route including links having the smallest sum of power reducing indexes to be the route of the request flow.

9. A method for determining, for a network including a number of nodes connected via links, a route through which a request flow between two of the nodes passes, each of the links having a characteristic of fluctuating link power consumption depending on an amount of link traffic, the method comprising:
    collecting a current amount of link traffic and current link power consumption of each of the links included in the network;
    setting, for each of the links, virtual links including a first virtual link that is capable of carrying a prospective amount of link traffic when the request flow is added and a second virtual link having a power consumption characteristic different from that of the first virtual link;
    estimating an increase in the link power consumption of each of the virtual links when the request flow is added based on the current amount of link traffic, the current link power consumption, the request flow, and the power consumption characteristic;
    calculating a link cost of each of the virtual links based on the estimated increase in the link power consumption;
    creating a constraint condition satisfying a requirement of end-to-end quality of the request flow based on change in quality of each of the virtual links by allocating the request flow to the virtual link, and satisfying a requirement of end-to-end quality of an existing flow based on the change in quality of the existing flow on the virtual link, by allocating the request flow to the virtual link;
    calculating, when two or more candidate routes having a smallest sum of the link costs satisfying the constraint condition exist, a power reducing index representing a possibility of reduction in power consumption due to reduction in traffic of each of the candidate routes having the smallest sum of the link costs; and
    determining a route having a smallest power reducing index among a plurality of routes, including a plurality of the virtual links satisfying the created constraint condition, to be the route of the request flow.

10. The method according to claim 9, wherein the second virtual link has higher forwarding capability achieved by a power consumption characteristic higher than that of the first virtual link.

11. The method according to claim 9, further comprising:
estimating quality of the request flow and quality influence on the existing flow based on traffic influence of the request flow on each of the virtual link;
setting linear constraint equations related to the end-to-end quality of the request flow and the existing flow to be the constraint condition; and
determining a route having the smallest sum of the link costs among a plurality of routes, including a plurality of the virtual links satisfying the created constraint condition, to be the route of the request flow.

12. The method according to claim 9, further comprising: estimating quality of the request flow and quality influence on the existing flow by applying influence of the request flow on traffic of the virtual link to a quality change forecasting function.

13. The method according to claim 9, wherein the creating creates the constraint condition based on quality of the request flow and quality influence on the existing flow each time the route of the request flow is determined.

14. A non-transitory computer-readable recording medium having stored therein a management program instructing a computer to determine, for a network including a number of nodes connected via links, a route through which a request flow between two of the nodes passes, each of the links having a characteristic of fluctuating link power consumption depending on an amount of link traffic, the program instructing the computer to execute:
collecting a current amount of link traffic and current link power consumption of each of the links included in the network;
setting, for each of the links, virtual links including a first virtual link that is capable of carrying a prospective amount of link traffic when the request flow is added and a second virtual link having a power consumption characteristic different from that of the first virtual link;
estimating an increase in the link power consumption of each of the virtual links when the request flow is added based on the current amount of link traffic, the current link power consumption, the request flow, and the power consumption characteristic;
calculating a link cost of each of the virtual links based on the estimated increase in the link power consumption;
creating a constraint condition satisfying a requirement of end-to-end quality of the request flow based on change in quality of each of the virtual links by allocating the request flow to the virtual link, and satisfying a requirement of end-to-end quality of an existing flow based on the change in quality of the existing flow on the virtual link by allocating the request flow to the virtual link;
calculating, when two or more candidate routes having a smallest sum of the link costs satisfying the constraint condition exist, a power reducing index representing a possibility of reduction in power consumption due to reduction in traffic of each of the candidate routes having the smallest sum of the link costs; and
determining a route having a smallest power reducing index among a plurality of routes, including a plurality of the virtual links satisfying the created constraint condition, to be the route of the request flow.

15. The non-transitory computer-readable recording medium according to claim 14, wherein the second virtual link has higher forwarding capability achieved by a power consumption characteristic higher than that of the first virtual link.

16. The non-transitory computer-readable recording medium according to claim 14, wherein the management program further instructs the computer to execute:
estimating quality of the request flow and quality influence on the existing flow based on traffic influence of the request flow on each of the virtual link;
setting liner constraint equations related to the end-to-end quality of the request flow and the existing flow to be the constraint condition; and
determining a route having the smallest sum of the link costs among a plurality of routes, including a plurality of the virtual links satisfying the created constraint condition, to be the route of the request flow.

17. The non-transitory computer-readable recording medium according to claim 14, wherein the management program further instructs the computer to execute: estimating quality of the request flow and quality influence on the existing flow by applying influence of the request flow on traffic of the virtual link to a quality change forecasting function.

18. The non-transitory computer-readable recording medium according to claim 14, wherein the management program further instructs the computer to execute setting the constraint condition based on quality of the request flow and quality influence on the existing flow each time the route of the request flow is determined.

19. A management device that, for a network including a number of nodes connected via links, passes a request flow through a route between two of the nodes, each of the links having a characteristic of fluctuating link power consumption depending on an amount of link traffic, the device comprising:
a processor;
the processor processing:
collecting a current amount of link traffic and current link power consumption of each of the links included in the network;
setting, for each of the links, virtual links including a first virtual link that is capable of carrying a prospective amount of link traffic when the request flow is added and a second virtual link having a power consumption characteristic different from that of the first virtual link;
estimating an increase in the link power consumption of each of the virtual links when the request flow is added based on the current amount of link traffic, the current link power consumption, the request flow, and the power consumption characteristic, and calculates a link cost of each of the virtual links based on the estimated increase in the link power consumption;
creating a constraint condition satisfying a requirement of end-to-end quality of the request flow based on change in quality of each of the virtual links by allocating the request flow to the virtual link, and
satisfying a requirement of end-to-end quality of an existing flow based on the change in quality of the existing flow on the virtual link by allocating the request flow to the virtual link;
calculating, when two or more candidate routes having a smallest sum of the link costs satisfying the constraint condition exist, a power reducing index representing the possibility of reduction in power consumption due to reduction in traffic of each of the candidate routes having the smallest sum;
determining a route having a smallest power reducing index among a plurality of routes, including a plurality of the virtual links satisfying the created constraint condition, to be the route of the request flow; and
passing the request flow through the determined route.

* * * * *